(12) United States Patent
Kaneda et al.

(10) Patent No.: US 12,087,944 B2
(45) Date of Patent: Sep. 10, 2024

(54) POSITIVE ELECTRODE ACTIVE MATERIAL FOR LITHIUM ION SECONDARY BATTERY, METHOD OF MANUFACTURING POSITIVE ELECTRODE ACTIVE MATERIAL FOR LITHIUM ION SECONDARY BATTERY, AND LITHIUM ION SECONDARY BATTERY

(71) Applicant: SUMITOMO METAL MINING CO., LTD., Tokyo (JP)

(72) Inventors: Haruki Kaneda, Ehime (JP); Yuki Koshika, Ehime (JP); Takuma Nakamura, Ehime (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 805 days.

(21) Appl. No.: 17/263,621

(22) PCT Filed: Jul. 30, 2019

(86) PCT No.: PCT/JP2019/029905
§ 371 (c)(1),
(2) Date: Jan. 27, 2021

(87) PCT Pub. No.: WO2020/027158
PCT Pub. Date: Feb. 6, 2020

(65) Prior Publication Data
US 2021/0305567 A1  Sep. 30, 2021

(30) Foreign Application Priority Data
Jul. 31, 2018 (JP) .................. 2018-144554

(51) Int. Cl.
*H01M 4/525* (2010.01)
*C01G 53/00* (2006.01)
(Continued)

(52) U.S. Cl.
CPC ............ *H01M 4/525* (2013.01); *C01G 53/50* (2013.01); *H01M 4/505* (2013.01);
(Continued)

(58) Field of Classification Search
CPC ... C01G 53/006; C01G 53/50; C01P 2002/54; C01P 2002/60; C01P 2002/72;
(Continued)

(56) References Cited

U.S. PATENT DOCUMENTS 7,851,088 B2  12/2010  Takahashi et al.
9,118,076 B2  8/2015  Kajiya et al.
(Continued)

FOREIGN PATENT DOCUMENTS

EP  1391950  2/2004
JP  2004-531034  10/2004
(Continued)

OTHER PUBLICATIONS

International Search Report mailed on Oct. 15, 2019 with respect to No. PCT/JP2019/029905.

*Primary Examiner* — Lingwen R Zeng
(74) *Attorney, Agent, or Firm* — IPUSA, PLLC

(57) ABSTRACT

The present invention relates to a positive electrode active material for a lithium ion secondary battery, including: lithium-nickel-manganese composite oxide particles having a layered hexagonal crystal system, wherein, the lithium-nickel-manganese composite oxide is represented by the following general formula:

$$Li_{1+t}Ni_aMn_bM_cMg_dO_{2+\alpha} \qquad (1)$$

in which an element M in the general formula (1) is at least one element selected from Co, Ti, W, B, Mo, V, Nb, Ca, Al, Cr, Zr, and Ta; $-0.05 \le t \le 0.2$, $0.50 \le a \le 0.95$, $0.03 \le b \le 0.40$, $0.02 \le c \le 0.40$, $0.0005 \le d \le 0.05$, $a+b+c+d=1.0$, and $0 \le \alpha \le 0.5$; wherein the lithium-nickel-manganese composite oxide par- (Continued)

ticles contains secondary particles formed by aggregation of primary particles of the lithium-nickel-manganese composite oxide particles, and wherein lattice constants a and c of the lithium-nickel-manganese composite oxide as determined by an X-ray diffraction method are 2.8640 Å≤a≤2.8750 Å and 14.195 Å≤c≤14.225 Å.

2 Claims, 5 Drawing Sheets

(51) Int. Cl.
  *H01M 4/505* (2010.01)
  *H01M 10/0525* (2010.01)
  *H01M 4/02* (2006.01)
  *H01M 4/131* (2010.01)
  *H01M 4/1391* (2010.01)
(52) U.S. Cl.
  CPC ...... *H01M 10/0525* (2013.01); *C01G 53/006* (2013.01); *C01P 2002/60* (2013.01); *C01P 2002/72* (2013.01); *C01P 2002/74* (2013.01); *C01P 2002/77* (2013.01); *C01P 2002/85* (2013.01); *C01P 2004/51* (2013.01); *C01P 2004/61* (2013.01); *H01M 2004/021* (2013.01); *H01M 2004/028* (2013.01); *H01M 4/131* (2013.01); *H01M 4/1391* (2013.01); *Y02E 60/10* (2013.01)
(58) Field of Classification Search
  CPC .............. C01P 2002/74; C01P 2002/77; C01P 2002/85; C01P 2004/51; C01P 2004/61; H01M 10/0525; H01M 2004/021; H01M 2004/028; H01M 4/131; H01M 4/1391; H01M 4/505; H01M 4/525; Y02E 60/10
  See application file for complete search history.

(56) References Cited

U.S. PATENT DOCUMENTS

| | | | |
|---|---|---|---|
| 9,742,002 | B2 | 8/2017 | Shimokita et al. |
| 10,017,875 | B2 | 7/2018 | Toya et al. |
| 2002/0192552 | A1 | 12/2002 | Lampe-Onnerud et al. |
| 2002/0192556 | A1 | 12/2002 | Lampe-Onnerud et al. |
| 2006/0057466 | A1 | 3/2006 | Suhara et al. |
| 2012/0326080 | A1 | 12/2012 | Okamoto et al. |
| 2013/0078520 | A1* | 3/2013 | Toya ............... H01M 4/131 429/223 |
| 2014/0197357 | A1 | 7/2014 | Ofer et al. |
| 2015/0249248 | A1 | 9/2015 | Ishizaki et al. |
| 2015/0380737 | A1 | 12/2015 | Kawasato et al. |
| 2016/0013475 | A1 | 1/2016 | Ofer et al. |
| 2018/0145321 | A1 | 5/2018 | Yamauchi et al. |

FOREIGN PATENT DOCUMENTS

| | | |
|---|---|---|
| JP | 2005-044743 | 2/2005 |
| JP | 2005-050712 | 2/2005 |
| JP | 2013-239434 | 11/2013 |
| JP | 2016-026981 | 2/2016 |
| JP | 2016-207479 | 12/2016 |
| JP | 2017-105709 | 6/2017 |
| WO | 2005/028371 | 3/2005 |
| WO | 2011/096522 | 8/2011 |
| WO | 2012/131881 | 10/2012 |

\* cited by examiner

⊢──┤ 0.5 μm

⊢──┤ 0.5 μm

⊢──┤ 0.5 μm

⊢—⊣ 0.5 μm

POSITIVE ELECTRODE ACTIVE MATERIAL FOR LITHIUM ION SECONDARY BATTERY, METHOD OF MANUFACTURING POSITIVE ELECTRODE ACTIVE MATERIAL FOR LITHIUM ION SECONDARY BATTERY, AND LITHIUM ION SECONDARY BATTERY

TECHNICAL FIELD

The present invention relates to a positive electrode active material for a lithium ion secondary battery, a method of manufacturing a positive electrode active material for a lithium ion secondary battery, and a lithium ion secondary battery.

BACKGROUND OF THE INVENTION

In recent years, with the spread of portable electronic devices such as cellular phones and notebook PCs, there is a strong need for the development of small, lightweight, secondary batteries with high energy density and durability. In addition, the development of high-output secondary batteries for electric vehicles such as hybrid vehicles or electric tools is strongly desired. In addition to the above demands, the need for a secondary battery that hardly deteriorates with repeated use and high durability has been increasing.

Lithium ion secondary batteries have been proposed as secondary batteries that satisfy such requirements. A lithium ion secondary battery is configured by, for example, a negative electrode, a positive electrode and an electrolyte, or the like. Active materials of the negative electrode and the positive electrode are materials that can intercalate and de-intercalate lithium ions. Lithium ion secondary batteries have high energy density, output characteristics, and durability, as described above.

Such lithium ion secondary batteries are currently being extensively researched and developed. Among them, lithium ion secondary batteries that use layered or spinel-type lithium metal composite oxide as a positive electrode material are capable of obtaining high voltages of 4V class, and thus have being practically used as batteries with high energy density.

Examples of the positive electrode materials, that have been mainly proposed, include a lithium-cobalt composite oxide ($LiCoO_2$), which is relatively easy to synthesize, a lithium-nickel composite oxide ($LiNiO_2$), which uses nickel that is less expensive than cobalt, a lithium-nickel-cobalt-manganese composite oxide ($LiNi_{1/3}CO_{1/3}Mn_{1/3}O_2$), a lithium-manganese composite oxide ($LiMn_2O_4$), which uses manganese, a lithium-nickel-manganese composite oxide ($LiNi_{0.5}Mn_{0.5}O_2$), and the like.

Of these, lithium-nickel-cobalt-manganese composite oxides ($LiNi_{0.33}Co_{0.33}Mn_{0.33}O_2$) have been gaining attention as positive electrode materials that can obtain high capacity with heat stability. The lithium-nickel-cobalt-manganese composite oxide is a layered compound same as the lithium-cobalt composite oxide and the lithium-nickel composite oxide. The transition metal site basically contains nickel, cobalt, and manganese in a composition ratio of 1:1:1.

In recent years, there is a need for high capacity batteries, such as batteries for automobiles, large storage batteries, and compact mobile devices. One method of increasing capacity is to increase the ratio of transition metals contributing to the redox. For example, a positive electrode material (nickel-rich positive electrode material) with a high nickel (Ni) content has been under active development.

A nickel-rich positive electrode material includes a positive electrode material having a composition ratio such as, for example, $LiNi_{0.4}Mn_{0.3}Co_{0.3}O_2$ or $LiNi_{0.5}Mn_{0.3}Co_{0.2}O_2$, and such a positive electrode material provides a high capacity. However, there are problems in the nickel-rich positive electrode material such that the durability deteriorates because cationic mixing readily occurs during the synthesis, or gas generation is increased due to the elution of alkali from the positive electrode material. In addition, the nickel-rich positive electrode material is insufficiently stable, because the crystal structure during overcharging becomes unstable, thereby a gas is likely to be generated. Therefore, various studies have been conducted to improve the performance of the nickel-rich positive electrode material.

Patent Document 1 discloses a positive electrode active material for a lithium ion battery represented by the following compositional formula:

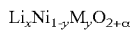

wherein M is one or more elements selected from Sc, Ti, V, Cr, Mn, Fe, Co, Cu, Zn, Ga, Ge, Al, Bi, Sn, Mg, Ca, B, and Zr, $0.9 \le x \le 1.2$, $0 < y \le 0.7$, and $\alpha > 0.1$; wherein ratio of peak strength (Ps104) on (104) plane to peak strength (Ps003) on (003) plane, which is (Ps104/Ps003), is 0.9 or less and a $2\theta$ of (110) plane is 64.6° or more according to powder X-ray diffraction. When the peak strength ratio is in the above-described range, the amount of cation mixing is reduced, and the positive active material for a lithium ion battery exhibits favorable battery characteristics.

Patent Document 2 discloses a positive electrode composition for a nonaqueous electrolyte secondary battery containing: a lithium transition metal complex oxide represented by the general formula $Li_aNi_{1-x-y}Co_xM_y^1W_zM_w^2O_2$ (wherein $1.0 \le a \le 1.5$, $0 \le x \le 0.5$, $0 \le y \le 0.5$, $0.002 \le z \le 0.03$, $0 \le w \le 0.02$, $0 \le x+y \le 0.7$, $M^1$ represents at least one element selected from the group consisting of Mn and Al, and $M^2$ represents at least one element selected from the group consisting of Zr, Ti, Mg, Ta, Nb and Mo); and a boron compound comprising at least a boron and an oxygen. According to Patent Document 2, the output power characteristics and cycling characteristics can be improved in a positive electrode composition using a lithium transition metal complex oxide that includes little to no cobalt, by using a positive electrode composition comprising lithium transition metal complex oxide comprising nickel and tungsten indispensably and a particular boron compound.

Patent Document 3 discloses that a positive electrode active material for a nonaqueous electrolyte secondary battery having at least a lithium-transition metal composite oxide of a layer structure, in which the lithium-transition metal composite oxide is a particle and magnesium is 20% or more on a surface of the lithium-transition metal composite oxide. According to Patent Document 3, by use of this positive electrode active material, a nonaqueous electrolyte secondary battery having excellent battery characteristics, specifically, cycle characteristics and low-temperature characteristics, can be achieved.

Patent Document 4 discloses that a cathode active material for a non-aqueous electrolyte secondary battery comprises lithium nickel manganese composite oxide particles having a layered hexagonal crystal structure and expressed by a general formula of $Li_{1+u}Ni_xMn_yCO_zM_tO_2$ (where $-0.05 \le u \le 0.50$, $x+y+z+t=1$, $0.33 \le x \le 0.7$, $0.1 \le y \le 0.55$, $0 \le z \le 0.4$, $0 \le t \le 0.1$, M is one or more added elements that are selected from among Mg, Ca, Al, Ti, V, Cr, Zr, Nb, Mo and W), the cathode active material having a median diameter of 2 to 8 μm, a value [(d90-d10)/median diameter], which is an index indicating an extent of particle size distribution thereof, of 0.60 or less, and having a hollow structure provided with an outer shell section of aggregated sintered primary particles and a hollow section inside the outer shell section. According to Patent Document 4, the invention provides a non-aqueous electrolyte secondary battery that uses that cathode active material and that has high capacity, good cyclability and high output.

RELATED-ART DOCUMENTS

Patent Documents

Patent Document 1: International Publication No. 2011/096522
Patent Document 2: Japanese Patent Application Laid-Open No. 2013-239434
Patent Document 3: Japanese Patent Application Laid-Open No. 2005-050712
Patent Document 4: International Publication No. 2012/131881

SUMMARY OF THE INVENTION

Problems to be Solved by the Invention

However, none of the above-described patent documents has studied whether the described the positive electrode active material compatibly fulfill the need for increased capacity, durability, and stability when used in lithium ion secondary batteries.

In view of the above-described problems in the prior art, in one aspect of the invention, an object of the present invention is to provide a positive electrode active material for a lithium ion secondary battery having high capacity, high durability, and high stability when used in a lithium ion secondary battery.

Means for Solving the Problems

According to one aspect of the present invention, to solve the above problem, a positive electrode active material for a lithium ion secondary battery includes lithium-nickel-manganese composite oxide particles having a layered hexagonal crystal system, wherein, the lithium-nickel-manganese composite oxide is represented by the following general formula:

$$Li_{1+t}Ni_aMn_bM_cMg_dO_{2+\alpha} \quad (1)$$

in which the M in the general formula (1) is at least one element selected from Co, Ti, W, B, Mo, V, Nb, Ca, Al, Cr, Zr, and Ta; $-0.05 \leq t \leq 0.2$, $0.50 \leq a \leq 0.95$, $0.03 \leq b \leq 0.40$, $0.02 \leq c \leq 0.40$, $0.0005 \leq d \leq 0.05$, $a+b+c+d=1.0$, and $0 \leq \alpha \leq 0.5$. In addition, the lithium-nickel-manganese composite oxide particles contain secondary particles formed by aggregation of primary particles of the lithium-nickel-manganese composite oxide particles, and the lattice constants a and c of the lithium-nickel-manganese composite oxide as determined by an X-ray diffraction method are 2.8640 Å≤a≤2.8750 Å and 14.195 Å≤c≤14.225 Å.

Effects of the Invention

According to one aspect of the present invention, a positive electrode active material for a lithium ion secondary battery having high capacity, high durability, and high stability when used in a lithium ion secondary battery can be provided.

DETAILED DESCRIPTION OF THE INVENTION

Figure 1:
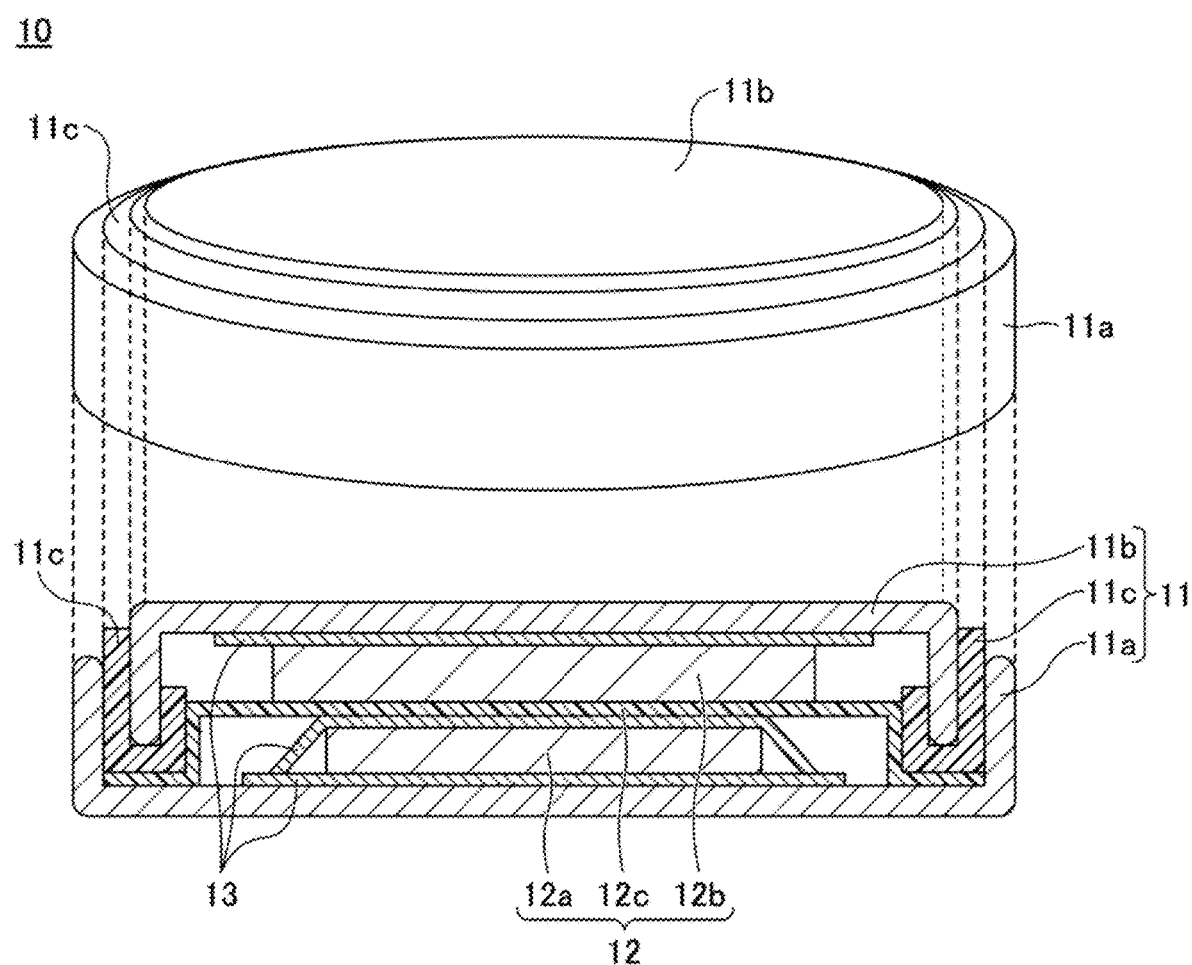
FIG. 1 is a schematic cross-sectional view of a coin cell battery used for battery evaluation.

Hereinafter, embodiments for carrying out the present invention will be described with reference to the drawings. However, the present invention is not limited to the described embodiments, and the following embodiments can be variously modified and replacements can be made to the embodiment without departing from the scope of the subject matter as defined in the appended claims.

[Positive Electrode Active Material for Lithium Ion Secondary Battery]

A positive electrode active material for a lithium ion secondary battery (hereinafter, also referred to as a "positive electrode active material") of the present embodiment includes lithium-nickel-manganese composite oxide particles having a layered hexagonal crystal system.

The lithium-nickel-manganese composite oxide is represented by the following general formula (1):

$$Li_{1+t}Ni_aMn_bM_cMg_dO_{2+\alpha} \quad (1)$$

wherein, the element M in the above general formula (1) is at least one element selected from Co, Ti, W, B, Mo, V, Nb, Ca, Al, Cr, Zr, and Ta; $-0.05 \leq t \leq 0.2$, $0.50 \leq a \leq 0.95$, $0.03 \leq b \leq 0.40$, $0.02 \leq c \leq 0.40$, $0.0005 \leq d \leq 0.05$, $a+b+c+d=1.0$, and $0 \leq \alpha \leq 0.5$.

The lithium-nickel-manganese composite oxide particles can contain secondary particles formed by aggregation of the primary particles of the lithium-nickel-manganese composite oxide particles. Lattice constants a and c of the lithium-nickel-manganese composite oxide as determined by X-ray diffraction method are preferably 2.8640 Å≤a≤2.8750 Å and 14.195 Å≤c≤14.225 Å.

The inventors of present invention diligently studied the positive electrode active material which exhibits high capacity, high durability, and high stability when applied to a lithium ion secondary battery. As a result, the present invention has been completed by finding that the addition of magnesium to a positive electrode active material containing a lithium-nickel-manganese composite oxide, and adjusting the range of lattice constants of the lithium-nickel-manganese composite oxide can result in a positive electrode active material having high capacity, high durability, high stability when used in a lithium ion secondary battery.

High capacity herein indicates that an initial charge and discharge capacity is superior when used in a lithium ion secondary battery. High durability indicates that a capacity maintenance rate is excellent when a lithium ion secondary battery is charged and discharged repeatedly. High stability indicates that expansion of the assembled cell caused by gas generated by an eluted alkali and an unfavorable oxygen-release caused by the heat applied during overcharging are inhibited.

The positive electrode active material of the present embodiment can include lithium-nickel-manganese composite oxide particles having a layered hexagonal crystal system as described above. The positive electrode active material of the present embodiment may be configured by the lithium-nickel-manganese composite oxide particles.

The lithium-nickel-manganese composite oxide can be represented by the above-described general formula (1) and can include magnesium (Mg). The magnesium is preferably dissolved in a lithium-nickel-manganese composite oxide, and is preferably evenly dispersed in primary particles of the lithium-nickel-manganese composite oxide.

In the above general formula (1), the range of a representing the content of Ni is preferably $0.50 \leq a \leq 0.95$, and more preferably $0.55 \leq a \leq 0.90$. When the value of a is within the above-described range, a high capacity can be obtained when a positive electrode active material containing lithium-nickel-manganese composite oxide particles is used in a lithium ion secondary battery.

In the above general formula (1), the range of b representing the content of Mn is preferably $0.03 \leq b \leq 0.40$, and more preferably $0.05 \leq b \leq 0.30$. When the value b is within the above-described range, excellent durability, high capacity, and high stability can be obtained when the positive electrode active material containing lithium-nickel-manganese composite oxide particles is used in a lithium ion secondary battery.

In addition, by including Ni and Mn in the lithium-nickel-manganese composite oxide in the above-described ratio, high capacity, high durability, and high stability can be satisfied when the positive electrode active material containing lithium-nickel-manganese composite oxide particles is used in a lithium ion secondary battery. In contrast, when the value of b is less than 0.03, improvements in the stability are insufficient, and when the value of b is more than 0.40, the battery capacity may be reduced.

The lithium-nickel-manganese composite oxide can further contain an additive element M as indicated in the above-described general formula (1). When the positive electrode active material containing the lithium-nickel-manganese composite oxide particles is used in a lithium ion secondary battery, the thermal stability and the storage characteristics can be improved, and the battery characteristics can be further improved.

As described above, the range of c, which indicates the content of the element M, is preferably $0.02 \leq c \leq 0.40$.

The description of the kinds of elements that can be preferably used as element M will be omitted herein, because it has already been described.

As described above, the lithium-nickel-manganese composite oxide contained in the positive electrode active material of the present embodiment can further contain magnesium. Thus, when magnesium is added to a lithium-nickel-manganese composite oxide, the stability can be particularly increased relative to a positive electrode active material used in a lithium ion secondary battery that does not include magnesium. In addition, a reduction of capacity with respect to the additive amount of magnesium is small compared to the case when other elements are added to a lithium-nickel-manganese composite oxide. Therefore, adding magnesium to a lithium-nickel-manganese composite oxide can improve the batter capacity when used in a lithium ion secondary battery.

The range of d, representing the content of Mg in the general formula (a) of above-described lithium-nickel-manganese composite oxide, is preferably $0.0005 \leq d \leq 0.05$. This stabilizes the crystal structure and achieves high capacity, durability and stability when used in a lithium ion secondary battery. In contrast, when d is less than 0.0005, the improvement in stability in insufficient, and when d is greater than 0.05, the crystal structure of the lithium-nickel-manganese composite oxide is unstable, which may lead to reduced battery capacity.

When d is in the range of more preferably $0.001 \leq d \leq 0.04$, and further more preferably $0.008 \leq d \leq 0.03$, the crystal structure is further stabilized, thereby increasing battery capacity, and improving stability of the battery.

The lithium-nickel-manganese composite oxide in the lithium-nickel-manganese composite oxide particles contained in the positive electrode active material of the present embodiment is preferably dissolved Mg in the crystal structure. Lattice constants a and c of the lithium-nickel-manganese composite oxide as determined by an X-ray diffraction method are preferably $2.8640 \text{ Å} \leq a \leq 2.8750 \text{ Å}$ and $14.195 \text{ Å} \leq c \leq 14.225 \text{ Å}$.

It is important that Mg is uniformly dissolved in the coordinates of 3a and 3b sites of a crystal structure, and not only dissolved in the crystalline structure. When magnesium is a dissolved state in a solid, that is, the lattice constants of a and c are within the above range, lithium intercalation and de-intercalation on the surface of positive electrode active material can be stably performed, and the diffusibility of lithium in the solid can be improved. As a result, high battery capacity and high durability can be obtained. Further, when the lattice constants a and c are within the above range, the crystal structure is stabilized, and an eluted alkali and an unfavorable oxygen-release caused by heat applied during overcharging are inhibited. That is, the stability can be improved.

In contrast, when either of the lattice constants a or c deviates from the above-described range, cationic mixing occurs, or a non-uniformity occurs when magnesium is a dissolved state in a solid, thereby destabilizing the crystal structure. Therefore, when the positive electrode active material containing the lithium-nickel-manganese composite oxide is used in a lithium ion secondary battery, the battery capacity and the stability of the crystal structure may be reduced.

The range of lattice constants a and c of the lithium-nickel composite oxide is preferably $2.8650 \text{ Å} \leq a \leq 2.8740 \text{ Å}$, $14.200 \text{ Å} \leq c \leq 14.223 \text{ Å}$ for obtaining particularly high battery capacity and stability.

A crystallite size of the lithium-nickel-manganese composite oxide particles contained in the positive electrode active material of the present embodiment is not particularly limited. However, the crystallite size determined by the Scherrer equation from the peak in the (003) plane in the X-ray diffraction pattern of the lithium-nickel-manganese composite oxide particles is preferably 1000 Å or more and 2000 Å or less, and more preferably 1200 Å or more and 1900 Å or less.

When the crystallite size is within the above-described range, the battery capacity can be particularly high when used in the positive electrode of a lithium ion secondary battery, and durability can be improved. When the crystallite size determined from the peak of the (003) plane is 1000 Å or more, excess crystallite boundaries can be prevented from becoming more and a resistance of positive electrode can be suppressed, thereby a particularly high battery capacity can be obtained. In addition, when the crystallite size obtained from the peak of the (003) plane is 2000 Å or less, excessive crystal growth can be suppressed, and nickel penetration into the lithium layer, which is a layered structured compound, of lithium-nickel-manganese composite oxide can be prevented. That is, when the crystallite size is 2000 Å or less, cationic mixing can be suppressed, so that the battery capacity can be particularly increased.

The lithium-nickel-manganese composite oxide particles contained in the positive electrode active material in the present embodiment can contain secondary particles formed by aggregation of the primary particles as described above. The lithium-nickel-manganese composite oxide particles may also be constituted from secondary particles formed by aggregation of the primary particles. The average particle size D50 of such secondary particles is preferably 5 μm or more and 20 μm or less, and more preferably 4 μm or more and 15 μm or less. When the average particle size D50 of the lithium-nickel-manganese composite oxide particles is in the above-described range, the output characteristics and the battery capacity can be particularly increased and also the packing ability to the positive electrode can be achieved, when the positive electrode active material of the present embodiment is used for the positive electrode of the lithium ion secondary battery. Specifically, when the average particle size D50 of the secondary particles is 5 μm or more, the packing ability of the positive electrode can be increased. In addition, when the average particle size of the secondary particles is 20 μm or less, the output characteristics and the battery capacity can be particularly increased.

In the present specification, the average particle size refers to the particle size at the cumulative value of 50% in the particle size distribution as determined by a laser diffraction-scattering method.

In the positive electrode active material of the present embodiment, the amount of eluted lithium, which is determined by the Warder method, is preferably 0.15% or mass or less and more preferably 0.145% by mass or less. The amount of eluted lithium is determined by the Wader method as described above. Specifically, for example, the amount of eluted lithium indicates that the amount of lithium calculated by neutralization titration of the filtrate after adding pure water to the positive electrode active material and stirring for a certain period of time. The amount of eluted lithium can be calculated by evaluating the state of eluted lithium compound from the neutralization point appears by adding hydrochloric acid while measuring the pH of the filtrate described above.

The amount of eluted lithium indicates the ratio of excess lithium adhering to the surface of the lithium-nickel-manganese composite oxide particles of the positive electrode active material of the present embodiment to the lithium nickel-manganese composite oxide particles. When the positive electrode active material of the present embodiment is used in a lithium ion secondary battery, the generation of various gases such as carbon dioxide, hydrogen carbonate gas, and CO gas during the charging and discharging reaction can be greatly reduced by adjusting the amount of eluted lithium to 0.15% by mass or less as described above. Therefore, a cell expansion can be suppressed.

In addition, when the eluted lithium content is in the above-described range, gelation of the slurry containing the positive electrode active material during preparing the electrode is unlikely generated, and the defect in the manufacturing process of the positive electrode of battery can be reduced. In other words, the improvement of the yield is an advantage in the production process.

In addition, in the positive electrode active material of the present embodiment, a temperature of peak oxygen release is higher than 225° C., as determined by a gas chromatography mass spectrometry (GC-MS) under conditions of at a temperature rise of 10° C./min after charging the battery to 4.5 V at a potential to Li metal. That is, it is preferable that the temperature of peak oxygen release is 225° C. or higher.

This is because, when heat is applied while the positive electrode active material is overcharged and the temperature of peak oxygen release is higher than 225° C., the positive electrode active material resists decomposition, and exhibits excellent thermal stability. Therefore, the likelihood that thermal runaway will occur is reduced.

According to the positive electrode active material described above, the lithium-nickel-manganese composite oxide containing magnesium has a predetermined lattice constant, and the crystal structure is controlled. Therefore, when such a positive electrode active material is used in a lithium ion secondary battery, thermal stability can be increased in addition to electrochemical properties such as a battery capacity, durability, and the like. That is, the positive electrode active material of the present embodiment can exhibit high capacity, high durability, and high stability when used in a lithium ion secondary battery.

[Method of Manufacturing Positive Electrode Active Material for Lithium Ion Secondary Battery]

Next, an example of a method of manufacturing a positive electrode active material for a lithium ion secondary battery of the present embodiment (hereinafter, also referred to as a "method of manufacturing a positive electrode active material") will be described.

According to the method of manufacturing the positive electrode active material of the present embodiment, the positive electrode active material mentioned in the above can be manufactured. For this reason, the explanation shall be omitted for some of the matters already explained.

The method of manufacturing the positive electrode active material of the present embodiment can be distinguished by, for example, a method of adding magnesium. It is arrested as magnesium together with other metals by coprecipitation (hereinafter, also referred to as "coprecipitation method"), or a method of adding magnesium in a solid phase (hereinafter, also referred to as "solid phase addition method"), or the like. In particular, because magnesium can be evenly dispersed, a coprecipitation method in which magnesium coprecipitates with other metals can be suitably used in a method of magnesium addition. First, an example of the method of manufacturing the positive electrode active material of the coprecipitation method in the present embodiment is described, but the example is not limited thereto.

A method of manufacturing a positive electrode active material for a lithium ion secondary battery of the present embodiment can include the following steps. A crystallization step of obtaining nickel-manganese composite hydroxide particles represented by a following general formula:

$$Ni_aMn_bM\text{-}Mg_d(OH)_{2+\beta} \qquad (2)$$

A mixing step of mixing the nickel-manganese composite hydroxide particles and a lithium compound to obtain a raw material mixture. A firing step of firing the raw material mixture obtained in the mixing step in a temperature range of 700° C. to 1,000° C. in an oxidizing atmosphere to obtain a lithium-nickel-manganese composite oxide. Note that, the element M in the above-described general formula (2) is at least one element selected from Co, Ti, W, B, Mo, V, Nb, Ca, Al, Cr, Zr, and Ta. In addition, a, b, c, d, and β in the above-described general formula (2) are 0.50≤a≤0.95, 0.03≤b≤0.40, 0.025c≤0.40, 0.0005≤d≤0.05, a+b+c+d=1.0, and 0≤β≤0.4.

Hereinafter, each step will be described in detail.

[Crystallization Step (A)]

The nickel-manganese composite hydroxide particles manufactured by the crystallization step can be the nickel-manganese composite hydroxide particles represented by the above-described general formula (2).

The crystallization step may be a step of having the nickel-manganese composite hydroxide particles represented by the above-described general formula (2) are crystallized, and the details are not particularly limited. For example, a mixed aqueous solution containing nickel (Ni), manganese (Mn), and magnesium (Mg), and possibly even element M, may be mixed with an alkaline aqueous solution to crystallize nickel-manganese composite hydroxide particles. The following procedure is preferably conducted.

First, water is put into a reactor to control the predetermined atmosphere and temperature. The atmosphere in the reactor is not particularly limited. For example, the atmosphere may be atmospheric (air atmosphere), and nitrogen or the like may also be supplied as needed. When gas is supplied into the reactor, the gas can be supplied by blowing it into a liquid in the reactor, for example, a reaction solution, to adjust the dissolved oxygen concentration of the liquid. A mixed aqueous solution containing at least nickel, manganese, and magnesium and an alkaline aqueous solution is then added to the reactor to form a reaction solution. The reaction solution can then be stirred at a constant rate to control pH so that nickel-manganese composite hydroxide particles can be coprecipitated and crystallized in the reactor (crystallization step).

In addition, a mixed aqueous solution containing some metals and an aqueous solution containing the remaining metals may be supplied instead of a mixed aqueous solution containing nickel, manganese, and magnesium. Specifically, a mixed aqueous solution containing, for example, nickel and manganese and an aqueous solution containing magnesium may be supplied. In addition, an aqueous solution of each metal may be prepared separately, and an aqueous solution containing each metal may be supplied to the reactor.

The mixed aqueous solutions containing nickel, manganese, and magnesium can be prepared by dissolving salts of each metal in water. The types of salts are not particularly limited, and one or more salts selected from, for example, sulfate, nitrate or chloride can be used. Although the salts of each metal may be different, the salts are preferably the same from the viewpoint of preventing contamination by impurities.

An alkaline aqueous solution can be prepared by adding an alkaline component to the water, which is a solvent. The type of alkaline component is not particularly limited, but for example, one or more kinds selected from sodium hydroxide, potassium hydroxide, sodium carbonate, or the like can be used.

The composition of the metallic element contained in the mixed aqueous solution and that of the metallic element contained in the nickel-manganese composite hydroxide obtained are almost identical. Accordingly, the composition of the metal element in the mixed aqueous solution is preferably selected to be the same as the composition of the metal element in the desired nickel-manganese composite hydroxide.

In the crystallization step, any other components can be added to the mixed aqueous solution in addition to the aqueous solution (mixed aqueous solution) containing the aforementioned metal components and the alkaline aqueous solution.

For example, a complexing agent may be added to the mixed aqueous solution in combination with the alkaline aqueous solution.

The complexing agent is not particularly limited. Any complexing agent capable of forming a complex by binding nickel ions or other metal ions in an aqueous solution may suitably be used. Examples of complexing agents include ammonium ion suppliers. Although the ammonium ion suppliers are not particularly limited, for example, one or more kinds selected from ammonia, ammonium sulfate, ammonium chloride, ammonium carbonate, ammonium fluoride, and the like can be used.

The temperature of the reaction solution in the crystallization step and the pH are not particularly limited, but the pH is preferably controlled so that the dissolved nickel concentration in the reaction solution is 5 mg/L or more and 1000 mg/L or less. Note that, the dissolved nickel concentration in the reaction solution is not limited to the above-described range, and the range can be selected according to the nickel ratio of the desired lithium-nickel-manganese composite oxide.

For example, when the complexing agent is not used, the temperature of the reaction solution is preferably higher than 60° C. and 80° C. or lower, and the pH of the reaction solution at the temperature of the reaction solution is preferably 10 or more and 12 or less (at 25° C.).

In the crystallization step, when the complexing agent is not used, the pH of the reaction solution is adjusted to 12 or less, so that the nickel-manganese composite hydroxide particles do not become fine particles, and the filtration property can be improved. In addition, spherical particles can be obtained more reliably.

In addition, when the pH of the reaction solution is adjusted to 10 or more, the rate of formation of the nickel-manganese composite hydroxide particles can be accelerated, it is possible to prevent some components such as nickel from remaining in the filtrate. Therefore, the desired composition of the nickel-manganese composite hydroxide particles can be obtained more reliably.

When the complexing agent is not used in the crystallization step, the solubility of nickel is increased by adjusting the temperature of the reaction solution to over 60° C. Therefore, it is possible to avoid the phenomenon in which the amount of precipitated nickel deviates from the target composition and coprecipitation does not occur more certainly.

In addition, when the temperature of the reaction solution is adjusted to 80° C. or lower, evaporation of water can be suppressed, thereby preventing the slurry concentration from increasing. By maintaining an appropriate slurry concentration, the precipitation of unintentional crystals, such as sodium sulfate, in the reaction solution, can be suppressed, and increases in the concentration of impurities can be avoided.

In contrast, when an ammonium ion supplier such as ammonia is used as a complexing agent, the pH of the reaction solution in the crystallization process is preferably 10 or more and 13 or less to increase the solubility of nickel. In this case, the temperature of the reaction solution is preferably 30° C. or higher and 60° C. or lower.

When the ammonium ion supplier is added to the reaction solution as a complexing agent, the ammonia concentration in the reaction solution in the reactor is preferably maintained within a range of 3 g/L or more and 25 g/L or less.

When the ammonia concentration in the reaction solution is adjusted to 3 g/L or more, the solubility of the metal ions can be particularly maintained to be constant. Therefore, primary particles of nickel-manganese composite hydroxide with well-shaped and well-sized particles can be formed. Therefore, for the obtained nickel-manganese composite hydroxide particles, the expansion of the particle size distribution can be suppressed.

In addition, excessively high solubility of the metal ions can be prevented and the amount of metal ions remaining in the reaction solution can be suppressed by adjusting the concentration of ammonia in the reaction solution to 25 g/L or less. Therefore, the nickel-manganese composite hydroxide particles of the desired composition can be obtained more reliably.

When the ammonia concentration varies, the solubility of the metal ions varies, and uniform hydroxide particles may not be formed. Therefore, it is preferable to maintain the ammonia concentration within a certain range. For example, during the crystallization step, the ammonia concentration is preferably maintained at the desired concentration with the upper and lower ranges being within about 5 g/L.

The precipitate can then be collected after it has reached a steady state, filtered, and washed in water to yield nickel-manganese composite hydroxide particles. Alternatively, a mixed aqueous solution and an alkaline aqueous solution, and possibly an aqueous solution containing an ammonium ion supplier, can be continuously supplied to the reactor. Then, the precipitate is collected by overflowing from the reactor, and the precipitate is filtered and washed with water to yield nickel-manganese composite hydroxide particles. When supplying raw materials, such as a mixed aqueous solution, to a reaction vessel continuously, the residence time in the reaction vessel of the mixed aqueous solution is not particularly limited. Preferably, the residence time is, for example, 3 hours or more and 12 hours or less so as to adjust the supply rate, from the viewpoint of sufficiently growing crystals and increasing productivity.

The nickel-manganese composite hydroxide may further contain element M, as shown in the general formula (2) above. When the positive electrode active material formed by the nickel-manganese composite hydroxide is used in the lithium ion secondary battery by adding the element M, the thermal stability, the storage property, and the battery property can be further improved.

As a method of compounding the element M with the nickel-manganese composite hydroxide particles, from the viewpoint of increasing the productivity of the crystallization step, a salt containing the element M or an aqueous solution containing the element M is preferably added to the aqueous solution containing the nickel, manganese, and magnesium to coprecipitate the nickel-manganese composite hydroxide particles (including the element M).

An aqueous solution containing element M or salt of element M may be used as the aqueous solution containing element M. Specifically, examples of an aqueous solution containing the element M includes an aqueous solution containing at least one of cobalt sulfate, cobalt chloride, titanium sulfate, tungsten oxide, boric acid, molybdenum oxide, molybdenum sulfide, vanadium pentoxide, niobic acid, calcium chloride, aluminum sulfate, sodium aluminate, chromium chloride, zirconium hydroxide, sodium tantalate, tantalic acid, and the like.

The element M may be added by coating the surface of nickel-manganese composite hydroxide particles with the element M in order to optimize the crystallization conditions and facilitate control of the composition ratio. In this case, the crystallization step of the method of manufacturing the positive electrode active material of the present embodiment may further include a coating step of coating the resulting particles with the element M on the surface of the nickel-manganese composite hydroxide.

In the coating step, the method of coating the element M onto the surface of the nickel-manganese composite hydroxide particles is not particularly limited. For example, any known methods can be used.

For example, nickel-manganese composite hydroxide particles are dispersed in pure water to form a slurry. The slurry is mixed with a solution containing an element M with a desired coverage amount, and an acid is added dropwise to adjust the slurry to a predetermined pH. At this time, the acid used is not particularly limited, but one or more acids selected from, for example, sulfuric acid, hydrochloric acid, and nitric acid can be used.

After the pH is adjusted, filtration and drying can be performed after mixing for a predetermined period of time to obtain a nickel-manganese composite hydroxide coated with element M.

The method of coating element M on the surface of the nickel-manganese composite hydroxide particles is not limited to the above-described method. For example, a solution containing the compound of element M and a solution containing the nickel-manganese composite hydroxide particles may be dried by spray drying, a solution containing the compound of element M may be impregnated with the nickel-manganese composite hydroxide particles, and the like may be used.

The nickel-manganese composite hydroxide particles provided in the coating step may be one in which a part of the element M is added in advance and may be one that does not contain the element M. When a part of element M is added in advance, for example, the aqueous solution containing element M may be added to the mixed aqueous solution when crystallization is performed as described above. Thus, when the nickel-manganese composite hydroxide particles contain a portion of element M, it is preferable to adjust the amount of element M to be added in the coating step to the desired amount.

[Mixing Step (B)]

In the mixing step, the nickel-manganese composite hydroxide particles obtained in the crystallization step and the lithium compound are mixed to obtain the raw material mixture.

The lithium compound is not particularly limited, but one or more kinds selected from, for example, lithium carbonate or lithium hydroxide can be used. In addition, lithium hydroxide may have hydration water and may be used with hydration water. However, the hydration water is preferably reduced by roasting in advance.

For mixing the nickel-manganese composite hydroxide particles with the lithium compound, a general mixer may be used, and one or more kinds selected from, for example, a shaker mixer, a Loedige mixer, a Julia mixer, a V-blender, or the like may be used. The mixing conditions in the mixing step are not particularly limited, but it is preferable to select the conditions so that the nickel-manganese composite hydroxide particles and the lithium compound are mixed sufficiently without breaking the structure such as nickel-manganese composite hydroxide particles.

The raw material mixture is preferably thoroughly mixed in the mixing step before being subjected to the firing step. If mixing is insufficient, problems may arise, such as variations in the Li/Me ratio between individual particles and inadequate battery characteristics. The Li/Me ratio indicates that the ratio of the number of atoms of lithium (Li) and a metal other than lithium (Me) contained in the raw material mixture.

The nickel-manganese composite hydroxide particles and the lithium compound are preferably mixed so that the Li/Me ratio in the raw material mixture is 0.95 or more and 1.20 or less.

The Li/Me ratio hardly changes before and after the firing step. For this reason, the Li/Me ratio in the raw material mixture is preferably mixed so as to be the same as the Li/Me ratio, which is the desired positive electrode active material obtained by the method of manufacturing the positive electrode active material of the present embodiment.

[Firing Step (C)]

In the firing step, the raw material mixture obtained in the mixing step can be fired at a temperature of 700° C. or higher and 1,000° C. or lower in an oxidizing atmosphere to obtain a lithium-nickel-manganese composite oxide.

In the firing step, when the raw material mixture is subjected to firing, lithium in the lithium compound diffuses into the nickel-manganese composite hydroxide particles, thereby forming a lithium-nickel-manganese composite oxide composed of particles having a polycrystalline structure. At this time, because magnesium is present in the precursor nickel-manganese composite hydroxide, the magnesium is easily and evenly dissolved in the coordinates of 3a and 3b sites of a crystal structure, and a lithium-nickel-manganese composite oxide having a lattice constant in the desired range is easily obtained.

In the firing step, as described above, the raw material mixture is preferably fired at a temperature of 700° C. or higher and 1,000° C. or lower in an oxidizing atmosphere, and more preferably fired at a temperature of 750° C. or higher and 950° C. or lower.

The diffusion of lithium into the nickel-manganese composite hydroxide particles can be sufficiently achieved by adjusting the firing temperature to 700° C. or higher. Therefore, for example, excess lithium and unreacted particles can be prevented from remaining, and a lithium-nickel-manganese composite oxide having a well-balanced crystalline structure of desired components can be obtained. Accordingly, the desired battery characteristics can be obtained when a positive electrode active material containing such lithium-nickel-manganese composite oxide particles is used in a lithium ion secondary battery.

In addition, sintering between the formed lithium-nickel-manganese composite oxide particles can be prevented and the occurrence of abnormal particle growth can be prevented by adjusting the firing temperature to 1,000° C. or lower. Note that, if abnormal particle growth occurs, the particle size after firing may become coarse and the particle shape may not be retained. Therefore, when the positive electrode is formed, the specific surface area may be reduced and the resistance of the positive electrode may increase, thereby reducing the battery capacity.

The firing time is preferably 3 hours or more, and more preferably 6 hours or more and 24 hours or less. This is because the formation of the lithium-nickel-manganese composite oxide will have sufficiently proceeded by 3 hours or more.

In addition, the atmosphere during firing is preferably an oxidizing atmosphere as described above, and in particular, an atmosphere in which the oxygen concentration is preferably 3% by volume or more and 100% by volume or less. For this reason, the firing is preferably carried out, for example, in the atmosphere or oxygen flow. This is because it is possible to sufficiently oxidize the lithium-nickel-manganese composite oxide by adjusting the oxygen concentration to 3% by volume or more, and the crystallinity of the lithium-nickel-manganese composite oxide can be sufficiently increased. Especially from the viewpoint of enhancing the battery characteristics, the firing is preferably carried out in an oxygen flow.

In the firing step, the lithium compound and the nickel-manganese composite hydroxide particles are preferably calcinated at a temperature of 200° C. or higher and lower than 700° C., which is the lower temperature than the firing temperature, then, the raw material mixture is fired at a temperature of 700° C. or higher and 1,000° C. or lower. The calcinating temperature is preferably 400° C. or higher and lower than 700° C. Lithium diffusion into the nickel-manganese composite hydroxide particles is sufficiently achieved, and a uniform lithium-nickel-manganese composite oxide can be obtained by calcinating the raw material mixture such temperature. For example, when lithium hydroxide is used in the lithium compound, the calcinating temperature is preferably maintained at 400° C. or higher and 550° C. or lower for 1 hour or more and 10 hours or less.

A furnace used for firing in the firing step is not particularly limited. For example, the furnace may be the one capable of firing the raw material mixture in the atmosphere or oxygen flow. An electric furnace with no gas generation is preferably used, and a batch-type furnace or a continuous-type furnace may be used.

In the lithium-nickel-manganese composite oxide particles obtained by firing, sintering between the particles are inhibited. However, coarse particles due to weak sintering and aggregation may be formed. In such a case, the particle size distribution is preferably adjusted by crushing the aforementioned sintering and aggregation.

The lithium-nickel-manganese composite oxide particles obtained after firing may be used as the positive electrode active material of the present embodiment.

The method of manufacturing the positive electrode active material of the present embodiment is not limited to the above-described steps, and the method may further include optional steps.

For example, further, a heat treatment step can be performed in which the nickel-manganese composite hydroxide particles are heat treated at a temperature of 105° C. or higher and 700° C. or lower prior to the mixing step (B). In this case, the heat-treated nickel-manganese composite hydroxide particles are mixed with a lithium compound to prepare the raw material mixture in the mixing step.

As described above, a method of adding magnesium in a solid phase (a solid phase addition method) can be used as the method of manufacturing the positive electrode active material of the present embodiment.

In this case, the crystallization step (A) can be performed in the same manner as the coprecipitation step described above, except that magnesium is not coprecipitated. Thus, nickel-manganese composite hydroxide particles without magnesium can be obtained.

Then, nickel-manganese composite hydroxide particles, a lithium compound, and a magnesium compound can be mixed in the mixing step (B).

The magnesium compound is not particularly limited, and one or more kinds selected from, for example, magnesium oxide, magnesium hydroxide, magnesium carbonate, magnesium sulfate, magnesium chloride, or the like can be used. In particular, one or more kinds of magnesium compounds selected from magnesium oxide, magnesium hydroxide, and magnesium carbonate are preferably used from the view point of easy availability or preventing the compounds from being contaminated with impurities.

When magnesium is added in the solid phase, the reactivity of the magnesium compound may vary depending on the particle size, and the particle size of the magnesium compound to be added is preferably adjusted to within a predetermined range. The average particle size of the magnesium compound to be added is preferably 0.01 µm or more and 10 µm or less, more preferably 0.05 µm or more and 3.0 µm or less, and even more preferably 0.08 µm or more and 1.0 µm or less.

When the average particle size of the magnesium compound is 0.01 µm or more, the powder becomes easier to handle, and it is capable of prevent the magnesium compound from scattering during the mixing and firing steps. Therefore, the desired composition of the positive electrode active material can be more reliably obtained.

In addition, the magnesium can be more evenly dispersed in the lithium-nickel-manganese composite oxide particles obtained after firing by adjusting the average particle size of the magnesium compound to 10 µm or less. Therefore, when the positive electrode active material containing the lithium-nickel-manganese composite oxide particles is applied to a lithium ion secondary battery, a particularly high capacity and a particularly high stability can be obtained.

The method of obtaining the magnesium compound having the above-described average particle size is not particularly limited. However, there is a method of crushing the magnesium compound to a predetermined particle size using a variety of milling machines, such as a ball mill, a planetary ball mill, a jet mill, a nanojet mill, a bead mill, a pin mill, and the like. Further, the magnesium compound may also be classified by a dry classifier or sieve, as needed. In particular, it is preferable to perform sieving to obtain particles having a particle size close to 0.01 µm.

When nickel-manganese composite hydroxide particles, a lithium compound, and a magnesium compound are mixed to obtain a raw material mixture, the raw material mixture is obtained by using the mixing machine described in the above-described coprecipitation step in the same manner to obtain the raw material mixture.

The raw material mixture obtained in the mixing step can be subjected to the firing step (C) as described in the coprecipitation step to obtain lithium-nickel-manganese composite oxide particles. The firing step (C) has already been described, as such the description will be omitted here. It is preferable that the experiment may be conducted in advance so that the lithium-nickel-manganese composite oxide with the desired lattice constant is obtained in a stable manner, because the lattice constant of the lithium-nickel-manganese composite oxide to be obtained, for example, may vary depending on the combination of the raw material used and the firing conditions.

[Lithium Ion Secondary Battery]

The lithium ion secondary battery (hereinafter, also referred to as "secondary battery") according to the present embodiment can have a positive electrode that includes the aforementioned positive electrode active material.

Hereinafter, an example of a secondary battery according to the present embodiment will be described for each component. The secondary battery in the present embodiment includes, for example, a positive electrode, a negative electrode, and a non-aqueous electrolyte, and is configured by the same components as a general lithium ion secondary battery. It should be noted that the embodiments described below are merely exemplary, and the lithium ion secondary battery of the present embodiment can be implemented in various modified and improved forms based on the knowledge of a person skilled in the art, including the following embodiments. In addition, the secondary battery is not particularly limited with respect to uses thereof.

(Positive Electrode)

The positive electrode of the secondary battery in the present embodiment can include the positive electrode active material described above.

An example of a manufacturing method of the positive electrode will be described below. First, the aforementioned positive electrode active material (in powder form), a conductive material, and a binding agent (binder) can be mixed to form a positive electrode mixture. If necessary, activated carbon or a solvent for adjusting the viscosity can be added to the positive electrode mixture, and followed by kneading to prepare a positive electrode mixture paste.

The mixing ratio of each material in the positive electrode mixture is a determinant of the performance of the lithium secondary battery. Therefore, the mixing ratio can be adjusted depending on the application. The mixing ratio of the materials may be the same as that of a known lithium ion secondary battery. For example, when the total mass of solids of the positive electrode mixture without solvent is 100% by mass, the positive electrode active material may contain 60% by mass or more and 95% by mass or less, the conductive material may contain 1% by mass or more and 20% by mass or less, and the binder may contain 1% by mass or more and 20% by mass or less.

The resulting positive electrode mixture paste is coated, for example, to a surface of an aluminum foil current collector, dried to evaporate solvent, and a sheet-like positive electrode is prepared. If necessary, pressure may be applied by roll press or the like to increase electrode density. The sheet-like positive electrode obtained in this way can be cut to a suitable size depending on a desired battery to be used. Accordingly, the sheet-like positive electrode can be used for producing a battery.

As the conductive material, for example, graphite (natural graphite, artificial graphite, expanded graphite, and the like) or carbon black-based material such as acetylene black or Ketchen Black (trademark), or the like can be used.

The binder serves to anchor the active material particles. Examples of binder include polyvinylidene fluoride (PVDF), polytetrafluoroethylene (PTFE), fluorine rubber, ethylene propylene diene rubber, styrene butadiene, cellulose-based resins, polyacrylic acid, or the like.

If necessary, a solvent to disperse the positive electrode active material and the conductive material, and a solvent to dissolve the binding agent are added to the positive electrode mixture. For example, an organic solvent such as N-methyl-2-pyrrolidone may be used as the solvent. An activated carbon can also be added to the positive electrode mixture to increase the electrical double layer capacity.

The method of manufacturing positive electrode is not limited to the example described above, but the positive electrode may be manufactured by other methods. For example, the positive electrode mixture may be press molded and then dried under vacuum.

(Negative Electrode)

The negative electrode may be a lithium metal, a lithium alloy, or the like. The negative electrode may be formed by mixing a negative electrode active material capable of intercalating and de-intercalating lithium ions with a binder agent, and further adding an appropriate solvent to the mixture so as to form a paste-like negative electrode mixture, then, the paste-like negative electrode mixture is coated to the surface of a metal foil current collector such as copper, and the resultant is subjected to be dried. The negative electrode may be compressed to increase the electrode density as needed.

As for the negative electrode active material, for example, an organic compound fired body such as natural graphite, artificial graphite and phenolic resins and the like, and powders of carbon materials such as coke can be used. In this case, a fluorine-containing resin such as PVDF may be used as the negative electrode binder in the same manner as the positive electrode. An organic solvent such as N-methyl-2-pyrrolidone may be used as the solvent for dispersing the active material and the binding agent.

(Separator)

A separator can be sandwiched between the positive and negative electrodes as needed. The separator separates the positive electrode from the negative electrode and retains the electrolyte. The separator may be a conventional thin-film, such as polyethylene or polypropylene having a number of microscopic pores.

(Non-Aqueous Electrolyte)

Examples of non-aqueous electrolyte include a non-aqueous electrolytic solution.

As the non-aqueous electrolytic solution, for example, a solution in which a lithium salt as a supporting salt is dissolved in an organic solvent, may be used. As the non-aqueous electrolytic solution, the solution in which a lithium salt is dissolved in an ionic liquid, may be used. The ionic liquid is a salt that includes cations and anions other than lithium ions and is the liquid even at room temperature.

The organic solvent may be a solvent selected from the group consisting of cyclic carbonates such as ethylene carbonate, propylene carbonate, butylene carbonate, and trifluoropropylene carbonate; a chain-like carbonate such as diethyl carbonate, dimethyl carbonate, ethyl methyl carbonate, and dipropyl carbonate; an ether compound such as tetrahydrofuran, 2-methyl tetrahydrofuran, and dimethoxyethane; a sulfur compound such as ethyl methyl sulfone and butanesultone; a phosphorus compound such as triethyl phosphate and trioctyl phosphate; and the like may be used alone. The organic solvent used may also be a mixture of two or more organic solvents.

As the supporting salt, $LiPF_6$, $LiBF_4$, $LiClO_4$, $LiAsF_6$, $LiN(CF_3SO_2)_2$, and their composite salts may be used. In addition, the non-aqueous electrolytic solution may contain radical scavengers, surfactants, flame retardants, and the like.

As the non-aqueous electrolyte, a solid electrolyte may be used. Solid electrolytes have the property to withstand high voltages. Examples of the solid electrolyte include inorganic solid electrolyte and organic solid electrolyte.

Examples of the inorganic solid electrolyte include an oxide-based solid electrolyte and a sulfide-based solid electrolyte.

The oxide-based solid electrolyte is not particularly limited. For example, the oxide-based solid electrolyte may preferably contain oxygen (O) and may preferably exhibit a lithium ion conductivity and an electron insulating property. Examples of the oxide-based solid electrolyte include lithium phosphate ($Li_3PO_4$), $Li_3PO_4N_x$, $LiBO_2N_x$, $LiNbO_3$, $LiTaO_3$, $Li_2SiO_3$, $Li_4SiO_4$—$Li_3PO_4$, $Li_4SiO_4$—$Li_3VO_4$, $Li_2O$—$B_2O_3$—$P_2O_5$, $Li_2O$—$SiO_2$, $Li_2O$—$B_2O_3$—$ZnO$, $Li_{1+x}Al_xTi_{2-x}(PO_4)_3$ ($0 \leq X \leq 1$), $Li_{1+x}Al_xGe_{2-x}(PO_4)_3$ ($0 \leq X \leq 1$), $LiTi_2(PO_4)_3$, $Li_{3x}La_{2/3-x}TiO_3$ ($0 \leq X \leq 2/3$), $Li_5La_3Ta_2O_{12}$, $Li_7La_3Zr_2O_{12}$, $Li_6BaLa_2Ta_2O_{12}$, $Li_{3.6}Si_{0.6}P_{0.4}O_4$, and the like.

The sulfide-based solid electrolyte is not particularly limited. For example, the sulfide-based solid electrolyte may preferably contain sulfur (S) and may preferably exhibit a lithium ion conductivity and an electron insulating property. Examples of the sulfide-based solid electrolyte include $Li_2S$—$P_2S_5$, $Li_2S$—$SiS_2$, $LiI$—$Li_2S$—$SiS_2$, $LiI$—$Li_2S$—$P_2S_5$, $LiI$—$Li_2S$—$B_2S_3$, $Li_3PO_4$—$Li_2S$—$Si_2S$, $Li_3PO_4$—$Li_2S$—$SiS_2$, $LiPO_4$—$Li_2S$—$SiS$, $LiI$—$Li_2S$—$P_2O_5$, and $LiI$—$Li_3PO_4$—$P_2S_5$, and the like.

An inorganic solid electrolyte other than the above may be used. For example, $Li_3N$, $LiI$, $Li_3N$—$LiI$—$LiOH$, or the like may be used.

The organic solid electrolyte is not particularly limited in the case of a polymer compound exhibiting ionic conductivity. For example, polyethylene oxide, polypropylene oxide, copolymers thereof, and the like may be used. The organic solid electrolyte may also contain a supporting salt (lithium salt).

(Shape and Configuration of the Secondary Battery)

The lithium ion secondary battery of the present embodiment described above can be in a variety of shapes, such as cylindrical or laminated shape. In any form, when the secondary battery according to the present embodiment uses a non-aqueous electrolytic solution as lithium ion, the positive electrode and the negative electrode can be laminated via a separator to form an electrode body. The obtained electrode body is impregnated with the non-aqueous electrolytic solution. Then, between the positive electrode collector and the positive electrode terminal leading to the outside and between the negative electrode collector and the negative electrode terminal leading to the outside is connected with a collector lead or the like, and sealed in a battery case.

As described above, the secondary battery according to the present embodiment is not limited to an embodiment using a non-aqueous electrolytic solution as a non-aqueous electrolyte. The secondary batter of the present embodiment may be, for example, a secondary battery using a solid non-aqueous electrolyte, that is, an all-solid-state battery. In the case of all-solid-state battery, the configuration other than the positive electrode active material can be changed as necessary.

The secondary battery of the present embodiment can satisfy high capacity, high durability, and high stability. The secondary battery of the present embodiment is suitable for power supply for compact portable electronic devices (such as notebook personal computers and mobile phone terminals) that require high capacity at all times, and for power supply for electric vehicles that require high output.

In addition, the secondary battery of the present embodiment is superior in stability, capacity, and durability compared to the secondary battery using a positive active material such as a conventional lithium-cobalt based oxide or lithium-nickel based oxide. Therefore, the secondary battery of the present embodiment can be miniaturized and has high output. Therefore, the secondary battery of the present embodiment is suitable as a power supply for an electric vehicle that is constrained by the mounting space. The secondary battery according to the present embodiment can be used not only as a power supply for an electric vehicle driven by purely electrical energy, but also as a power supply for a so-called hybrid vehicle combined with a combustion engine such as a gasoline engine or a diesel engine.

EXAMPLE

Although the present invention will be described in further detail in the following examples and comparative examples, the present invention is not limited in any way by these examples. The analysis method of the metal contained in the positive electrode active material and various evaluation methods of the positive electrode active material in the Examples and Comparative Examples are as follows.

(1) Analysis of the Composition

The compositions of the positive electrode active material obtained in each of the following Examples and Comparison Examples were evaluated by an ICP emission spectroscopy using an ICP emission spectrometer (model: ICPE9000, manufactured by Shimadzu Corporation).

(2) Average Particle Size D50

The particle size distribution was measured by a laser diffraction scattering particle size analyzer (Microtrack HRA, manufactured by Nikkiso Co., Ltd.) to calculate an average particle size D50.

(3) Crystal Structure, Lattice Constant, (003) Crystallite Size, Presence of Heterogeneous Phases XRD measurement results using an XRD diffractometer (X'Pert PRO, manufactured by manufactured by Malvern PANalytical Ltd.) were used to identify crystal structures and check for any heterogeneous phases.

In addition, Rietvelt analysis was performed from the XRD diffraction pattern, and lattice constants a and c were calculated. In addition, the (003) plane peaks that existed at around $2\theta=18°$ were analyzed, and the (003) crystallite size was calculated using the Scherrer's equation.

(4) Conductivity

A powder resistivity measurement system (MCP-PD51, manufactured by former Mitsubishi Chemical Analytech Co., Ltd.) was used to pressurize 3 g of the sample to 63.66 MPa and measure with a 4-point probe.

(5) Amount of Eluted Lithium

The amount of eluted lithium from the positive electrode active material into the filtrate was evaluated by the Warder method, which is a neutralization titration method.

The lithium hydroxide (LiOH) and lithium carbonate ($Li_2CO_3$) were calculated based on the evaluation results by the Warder method, and the sum of these lithium amounts was used as the amount of eluted lithium.

Specifically, the state of eluted lithium compound from the neutralization point was evaluated and calculated by adding pure water to the positive electrode active material obtained in the following Examples and Comparative Examples, stirring, and adding hydrochloric acid while measuring the pH of the filtered filtrate.

The titration described above was measured to the second neutralization point. The alkaline component neutralized with hydrochloric acid to the second neutralization point was used as the amount of lithium derived from lithium hydroxide (LiOH) and lithium carbonate ($Li_2CO_3$), and the amount of lithium in the filtrate was calculated from the amount of hydrochloric acid dropped up to the second neutralization point and the concentration of hydrochloric acid.

Then, the amount of lithium calculated in the filtrate was divided by the amount of a sample of the positive electrode active material used in preparing the filtrate, and the amount of eluted lithium of the positive electrode active material was calculated by converting the unit to % by mass.

(6) Initial Charge and Discharge Capacities

A 2032 coin cell battery 10 illustrated in FIG. 1 (hereinafter referred to as "coin cell battery") was used in evaluating the positive electrode active material prepared according to the following Examples and Comparative Examples. FIG. 1 illustrates a perspective view and a cross-sectional view of the coin cell battery.

As illustrated in FIG. 1, the coin cell battery 10 is configured by a case 11 and an electrode 12 contained within the case 11.

The case 11 has a positive electrode can 11a that is hollowed out and has one end open and a negative electrode can 11b that is disposed at the opening of the positive electrode can 11a. When the negative electrode can 11b is disposed at the opening of the positive electrode can 11a, a space to accommodate the electrode 12 is formed between the negative electrode can 11b and the positive electrode can 11a.

The electrode 12 includes of a positive electrode 12a, a separator 12c, and a negative electrode 12b and is laminated in this order. The positive electrode 12a contacts the inner surface of the positive electrode can 11a through a current collector 13, and the negative electrode 12b contacts the inner surface of the negative electrode can 11b through the current collector 13. The current collector 13 is also disposed between the positive electrode 12a and the separator 12c.

The case 11 includes a gasket 11c, which restricts relative movement of the positive electrode can 11a and the negative electrode can 11b so as to maintain the non-contact between the positive electrode can 11a and the negative electrode can 11b. The gasket 11c also has a function of sealing the gap between the positive electrode can 11a and the negative electrode can 11b to air-tight and liquid-tight the inside of the case 11.

The coin cell battery 10 illustrated in FIG. 1 was prepared as follows.

First, 52.5 mg of the positive electrode active material, 15 mg of acetylene black, and 7.5 mg of polytetrafluoroethylene (PTFE) resin were mixed, and the resulting positive electrode mixture was press-molded to a diameter of 11 mm and a thickness of 100 μm at a pressure of 100 MPa to prepare the positive electrode 12a. The prepared positive electrode 12a was dried in a vacuum dryer at 120° C. for 12 hours.

A coin cell battery was prepared in a glove box using the positive electrode 12a, the negative electrode 12b, the separator 12c, and the electrolyte described above, under an Ar atmosphere. The dew point in the glove box was maintained at −80° C.

For the negative electrode 12b, a lithium (Li) metal having a diameter of 17 mm and a thickness of 1 mm was used. A polyethylene porous membrane with a thickness of 25 μm was used for the separator 12c.

The electrolyte used was a mixture of equal volumes of ethylene carbonate (EC) and diethyl carbonate (DEC) containing 1 M of LiClO₄ as the supporting electrolyte (supporting salt) (manufactured by Tomiyama pure chemical industries, Ltd.).

The initial charge capacity indicating the performance of the manufactured coin cell battery 10 and the initial discharge capacity (also referred to as "initial charge and discharge capacity") were evaluated as follows.

The coin cell battery 10 was left for about 24 hours after preparation of the coin cell battery illustrated in FIG. 1. After an open-circuit voltage (OCV) was stabilized, a current density relative to the positive electrode was set to 0.1 mA/cm². A capacity when the battery was charged to be a cut-off voltage of 4.3 V was set as an initial charge capacity. After a pause of one hour, the battery was discharged to be the cut-off voltage of 3.0 V, and the discharged capacity was set as the initial discharge capacity. In regards to an initial discharge capacity. A multi-channel voltage/current generator (R6741A, manufactured by Advantest Corporation) was used to measure the initial charge and discharge capacity. The measurements were conducted at 25° C.

(7) Positive Electrode Resistance

Figure 2A:
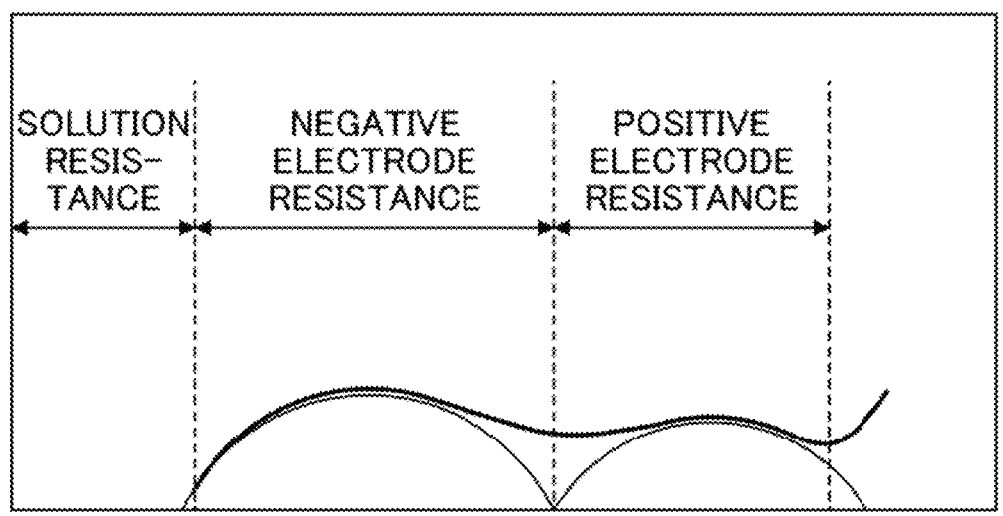
FIG. 2A is an explanatory view of a calculation method of a positive electrode resistance.
Figure 2B:
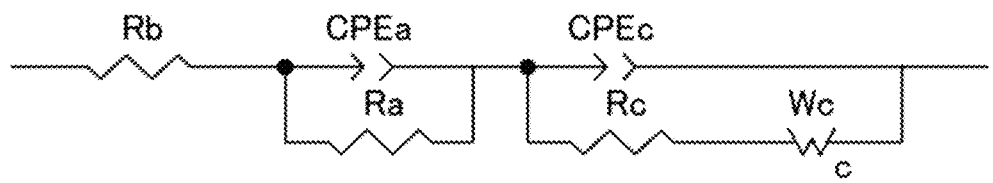
FIG. 2B is an explanatory view of a calculation method of a positive electrode resistance.

The positive electrode resistance was also measured by an AC impedance method charging the coin cell battery manufactured in the same condition as evaluating initial charge and discharge capacities at a charge potential of 4.1 V. A temperature condition of resistance measurement was set to 25° C. in the same condition as initial charge and discharge capacities. A frequency response analyzer and Potentiostat/Galvanostat (1255B, manufactured by Solartron Analytical) were used for a measurement to obtain the Nyquist plot illustrated in FIG. 2A. The fitting calculation was performed using the equivalent circuit illustrated in FIG. 2B, and the value of the positive electrode resistance (reaction resistance) was calculated.

(8) Evaluation of Durability (Capacity Maintenance Rate)

Figure 3:
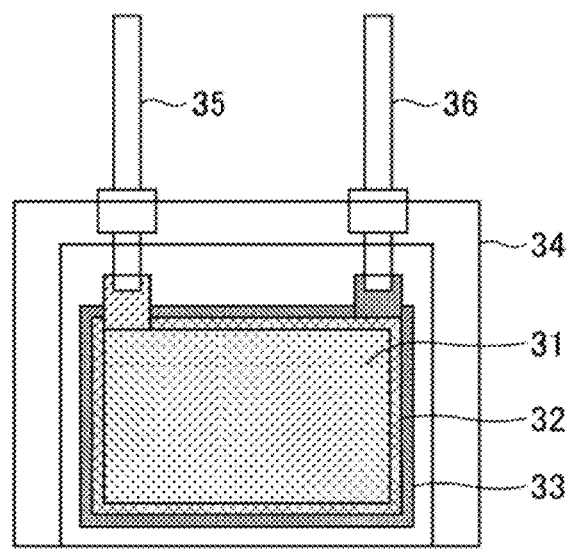
FIG. 3 is a schematic cross-sectional view of a laminated battery used for battery evaluation.

A laminated battery illustrated in FIG. 3 was used to evaluate the durability of the positive electrode active material. Hereinafter, a method of manufacturing a laminate-type battery will be described.

The obtained positive electrode active material was used to prepare the laminate-type battery 30 illustrated in FIG. 3. FIG. 3 is a perspective view illustrating the structure inside the laminate-type battery 30.

The laminate-type battery 30 has a structure in which an electrolytic solution impregnated in a laminate of a positive electrode film 31, a separator 32, and a negative electrode film 33 is sealed by a laminate 34. A positive electrode tab 35 is connected to the positive electrode film 31, and a negative electrode tab 36 is connected to the negative electrode film 33. The positive electrode tab 35 and the negative electrode tab 36 are exposed outside the laminate 34.

The obtained positive electrode active material, acetylene black (conductive material), and polyvinylidene fluoride (PVDF, binding agent) were mixed at a mass ratio of 85:10:5, and the mixture was dispersed in the solvent N-methyl-2-pyrrolidone (NMP) to prepare a slurry. An aluminum current collector foil (a thickness of 0.02 mm) was coated with the slurry except for the positive electrode tab 35. Then, the slurry containing the positive electrode active material coated on the aluminum current collector foil was dried for 30 minutes at a temperature of 120° C. in a blower dryer, and rolled by a roll-press to obtain a positive electrode film of 5.0 cm×3.0 cm. Accordingly, the positive electrode film 31, in which the positive electrode active material layer having a unit weight of 7 mg/cm² of positive electrode active material was formed on the aluminum current collector foil, was formed.

In addition, the negative electrode mixture paste, which is a mixture of carbon powder (acetylene black) and polyvinylidene fluoride, was coated to a copper current collector foil (a thickness of 0.02 mm) and dried to prepare the negative electrode film 33 in which a negative electrode active material layer having a unit weight of 5 mg/cm² of negative electrode active material was formed.

The separator 32 made of cellulose was interposed between the obtained positive electrode film 31 and the negative electrode film 33 to form a laminated sheet. The laminated sheet was sandwiched by two laminated sheets 34, that were aluminum laminate films, (thickness of 0.05 mm), and the three sides of the laminated sheet 34 were thermally bonded and sealed to assemble the laminate-type battery 30.

Subsequently, 260 μl of an electrolyte solution manufactured by Ube Industries, Ltd., containing LiPF₆ (1 mol/L) and cyclohexylbenzene (2% by weight) was mixed with ethylene carbonate, ethyl methyl carbonate, and dimethyl carbonate (3:3:4 in volume ratio), and the remaining side of the laminated sheet was thermally bonded to prepare the laminate-type battery 30. The laminate-type battery 30 prepared was 60 mm in length and 90 mm in width.

The resulting laminate-type battery 30 was CC-charged (constant current charge) to 4.1 V at a 2C rate at a temperature of 60° C. After a pause of 10 minutes, the battery was cc-discharged to 3.0 V at the same rate and subjected to a pause of 10 minutes. Such a cycle of charge and discharge was repeated 500 times. The first and 500th cycles of discharge capacity were measured, and the percentage of 2C discharge capacity at 500th cycle relative to 2C discharge capacity at first cycle was determined as the capacity maintenance rate (%).

(9) Thermal Stability Evaluation

Thermal stability evaluation of the positive electrode active material was performed by quantifying the amount of oxygen released by heating the positive electrode active material under overcharging conditions. Coin cell batteries were manufactured under the same conditions as the above mentioned (6) Initial charge and discharge capacities, and CCCV charge (constant current-constant voltage charge) was conducted at 0.2C rate up to a cut-off voltage of 4.5 V. Subsequently, the coin cell battery was dismantled, carefully removed only the positive electrode to avoid shorting, washed with DMC (dimethyl carbonate), and dried. Approximately 2 mg of dried positive electrode was weighed and the temperature was raised from room temperature to 450° C. at a rate of 10° C./min using a gas chromatograph mass spectrometer (GC-MS, QP-2010 plus, manufactured by Shimadzu Corporation). Helium was used as the carrier gas. The flow rate of helium gas was 35 cc/min. The generation behavior of oxygen (m/z=32) during heating was measured, and the temperature when the peak of the maximum oxygen generation appeared was determined.

For this reason, the higher the temperature at the maximum oxygen generating peak obtained by the thermal stability evaluation, is the more difficult to release oxygen even when heated in the overcharged state. This indicates a favorable thermal stability.

Example 1

The positive electrode active material was prepared and evaluated according to the following procedure.

(Crystallization Step)

50 L of pure water was added to a reactor (60 L), and the temperature in the reactor was set to 42° C. while stirring. The temperature in the reactor was maintained at 42° C. until the crystallization step was completed. At this time, $N_2$ gas and Air gas were passed through the reactor so that the dissolved oxygen concentration in the reactor liquid was 1.2 mg/L.

A mixed aqueous solution, an alkaline aqueous solution, and a complexing agent were continuously added to the reactor at the same time. At this time, the flow rate was controlled so that the residence time of the mixed aqueous solution was 8 hours, and the dissolved nickel concentration in the reactor was adjusted by pH control so as to be 600 mg/L. At this time, the ammonia concentration was controlled to be 12.5 g/L±1.0 g/L and the pH was controlled to 11.87 (at 42° C.).

As a mixed aqueous solution, nickel sulfate, manganese sulfate, cobalt sulfate, and magnesium sulfate were dissolved in water. The mixed aqueous solution was adjusted so that the molar ratio of nickel: manganese: cobalt: magnesium was 59.9:20:20:0.1 and the metal concentration was 2.0 M ($mol/dm^3$).

As the alkaline aqueous solution, a 25% by mass of sodium hydroxide solution was used.

As the complexing agent, a 25% by mass of ammonia solution was used.

After the reactor was stabilized, a slurry containing nickel-manganese composite hydroxide particles was collected from an overflow spout, and filtered to obtain a cake of the nickel-manganese composite hydroxide (a crystallization step). One liter of pure water was passed through 140 g of nickel-manganese composite hydroxide in the filter cloth to remove impurities.

The powder after filtration was dried to obtain nickel-cobalt-manganese composite hydroxide particles represented by $Ni_{0.599}Mn_{0.200}Co_{0.200}Mg_{0.001}(OH)_2$.

(Mixing Step)

The resulting nickel-cobalt composite hydroxide particles and lithium carbonate were weighed out to a Li/Me ratio of 1.03 and then thoroughly mixed using a shaker mixer (TURBULA Type T2C, manufactured by Willy A. Bachofen AG (WAB)) to obtain a raw material mixture.

(Firing Step)

The resulting raw material mixture was fired at 895° C. for 10 hours in an air flow (oxygen: 21% by volume), and then crushed to obtain a positive electrode active material containing lithium-nickel-manganese composite oxide particles. Meanwhile, from the measurement results of the XRD diffraction pattern, it was confirmed that a lithium-nickel-manganese composite oxide having a layered hexagonal crystal system was obtained. The lithium-nickel-manganese composite oxides obtained in Examples 2 to 6 below were found to have similar crystalline structures.

The evaluation results of the obtained positive electrode active materials are indicated in Tables 1 and 2.

Cross-sections of the resulting lithium-nickel-manganese composite oxide particles were observed by STEM-EDX to map the distribution of nickel, manganese, cobalt, and magnesium within the particles. The results confirmed that nickel, manganese, cobalt, and magnesium are all evenly dispersed in the primary particles of lithium-nickel-manganese composite oxide. Therefore, it was confirmed that magnesium was dissolved in lithium-nickel-manganese composite oxides and evenly dispersed in the primary particles of lithium-nickel-manganese composite oxide. It was also confirmed that the obtained lithium-nickel-manganese composite oxide particles had formed secondary particles in which the primary particles were aggregated. In addition, the lithium-nickel-manganese composite oxide particles obtained in Examples 2 to 6 below were similarly evaluated, and the same was confirmed.

Example 2

As a mixed aqueous solution, nickel sulfate, manganese sulfate, cobalt sulfate, and magnesium sulfate were dissolved in water. The mixed aqueous solution was adjusted so that the molar ratio of nickel:manganese:cobalt:magnesium was 59. 8:19. 8:19. 9:0. 5 and the metal concentration was 2.0 M ($mol/dm^3$). Other than that, a positive electrode active material was prepared and evaluated in the same manner as Example 1.

The results are indicated in Tables 1 and 2.

Example 3

As a mixed aqueous solution, nickel sulfate, manganese sulfate, cobalt sulfate, and magnesium sulfate were dissolved in water. The mixed aqueous solution was adjusted so that the molar ratio of nickel:manganese:cobalt:magnesium was 59.6:19.7:19.7:1.0 and the metal concentration was 2.0 M ($mol/dm^3$). Other than that, a positive electrode active material was prepared and evaluated in the same manner as Example 1.

The results are indicated in Tables 1 and 2.

Example 4

As a mixed aqueous solution, nickel sulfate, manganese sulfate, cobalt sulfate, and magnesium sulfate were dissolved in water. The mixed aqueous solution was adjusted so that the molar ratio of nickel:manganese:cobalt:magnesium was 58. 8:19. 1:19. 1:3. 0 and the metal concentration was 2.0 M ($mol/dm^3$). Other than that, a positive electrode active material was prepared and evaluated in the same manner as Example 1.

The results are indicated in Tables 1 and 2.

Example 5

(Crystallization Step)

50 L of pure water was added to a reactor (60 L), and the temperature in the reactor was set to 49° C. while stirring. The temperature in the reactor was maintained at 49° C. until the crystallization step was completed. At this time, $N_2$ gas and Air gas were passed through the reactor so that the dissolved oxygen concentration in the reactor liquid was 1.8 mg/L.

A mixed aqueous solution, an alkaline aqueous solution, and a complexing agent were continuously added to the reactor at the same time. At this time, the flow rate was controlled so that the residence time of the mixed aqueous solution was 8 hours, and the dissolved nickel concentration in the reactor was adjusted by pH control so as to be 20 mg/L. At this time, the ammonia concentration was controlled to be 12.5 g/L+1.0 g/L.

As a mixed aqueous solution, nickel sulfate, manganese sulfate, cobalt sulfate, and magnesium sulfate were dissolved in water. The mixed aqueous solution was adjusted so that the molar ratio of nickel:manganese:cobalt:magnesium was 79. 3:9. 7:10. 0:1.0 and the metal concentration was 2.0 M ($mol/dm^3$).

As an alkaline aqueous solution, a 25% by mass of sodium hydroxide solution was used.

As a complexing agent, 25% by mass of ammonia solution was used.

After the reactor was stabilized, a slurry containing nickel-manganese composite hydroxide particles was collected from an overflow spout, and filtered to obtain a cake of the nickel-manganese composite hydroxide (a crystallization step). One liter of pure water was passed through 140 g of nickel-manganese composite hydroxide in the filter cloth to remove impurities.

The powder after filtration was dried to obtain nickel-cobalt-manganese composite hydroxide particles represented by $Ni_{0.793}Mn_{0.097}Co_{0.10}Mg_{0.01}(OH)_2$.

(Mixing Step)

The resulting nickel-cobalt composite hydroxide particles and lithium carbonate were weighed out to a Li/Me ratio of 1.02 and then thoroughly mixed using a shaker mixer (TURBULA Type T2C, manufactured by Willy A. Bachofen AG (WAB)) to obtain a raw material mixture.

Note that, the Li/Me ratio was the ratio of the number of atoms of lithium and other metals, and Me was the sum of the number of atoms of nickel, cobalt, manganese, and magnesium in the present embodiment.

(Firing Step)

The resulting raw material mixture was fired by holding at 800° C. for 10 hours in a flow of oxidizing atmosphere (oxygen: 80% by volume), and then crushed to obtain a positive electrode active material containing lithium-nickel-manganese composite oxide particles.

The evaluation results of the obtained positive electrode active material are indicated in Tables 1 and 2.

Cross-sections of the resulting lithium-nickel-manganese composite oxide particles were observed by STEM-EDX to map the distribution of each element within the particles for nickel, manganese, cobalt, and magnesium. The results of STEM observational images and mapping are shown in FIGS. 4A to 4E.

Figure 4A:
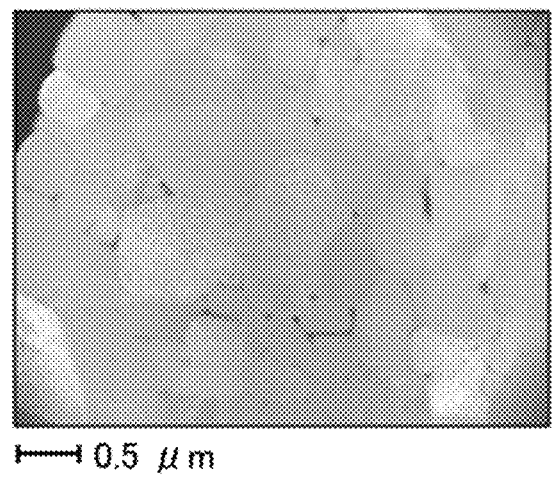
FIG. 4A is an evaluation result of STEM-EDX in a cross-section of lithium-nickel-manganese composite oxide particles obtained in Example 5.
Figure 4B:
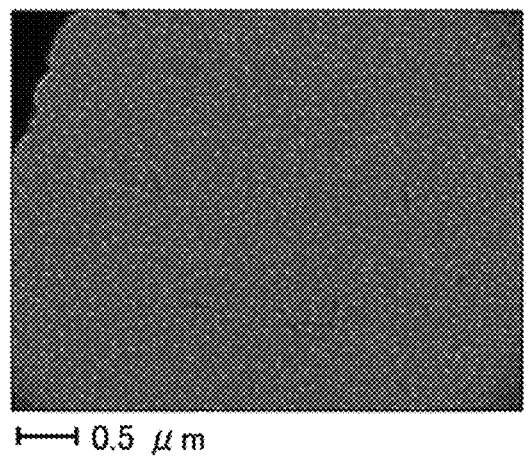
FIG. 4B is an evaluation result of STEM-EDX in a cross-section of lithium-nickel-manganese composite oxide particles obtained in Example 5.
Figure 4C:
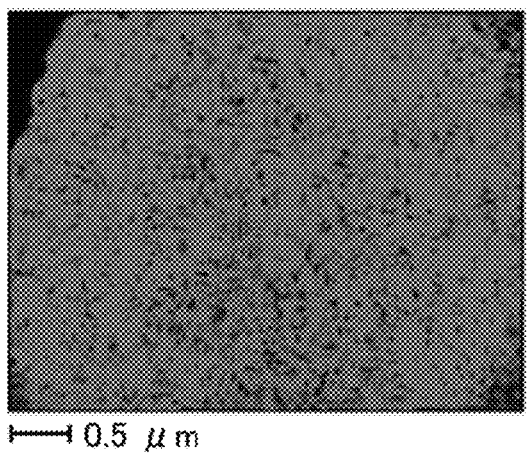
FIG. 4C is an evaluation result of STEM-EDX in a cross-section of lithium-nickel-manganese composite oxide particles obtained in Example 5.
Figure 4D:
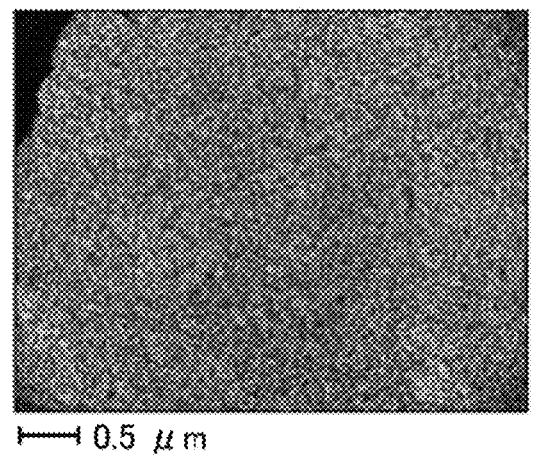
FIG. 4D is an evaluation result of STEM-EDX in a cross-section of lithium-nickel-manganese composite oxide particles obtained in Example 5.
Figure 4E:
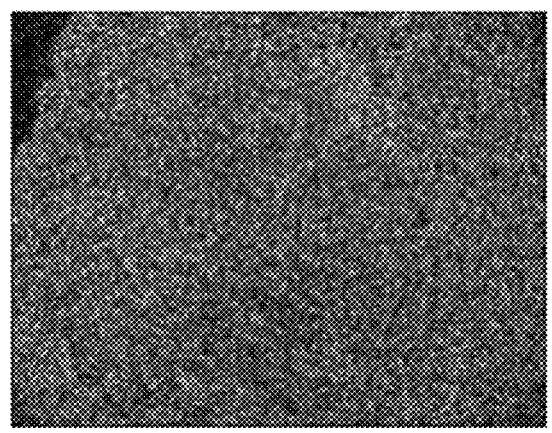
FIG. 4E is an evaluation result of STEM-EDX in a cross-section of lithium-nickel-manganese composite oxide particles obtained in Example 5.

FIG. 4A is a STEM image of a cross-section of lithium-nickel manganese composite oxide particles. FIG. 4B is a mapping image of nickel, FIG. 4C is a mapping image of manganese, FIG. 4D is a mapping image of cobalt, and FIG. 4E is a mapping image of magnesium.

As can be seen from the comparison of FIG. 4A with FIGS. 4B to 4E, all of nickel, manganese, cobalt, and magnesium were evenly dispersed in the primary particles of the lithium-nickel-manganese composite oxide. Therefore, it was confirmed that magnesium was dissolved in lithium-nickel-manganese composite oxides and evenly dispersed in the primary particles of lithium-nickel-manganese composite oxide.

Example 6

As a mixed aqueous solution, nickel sulfate, manganese sulfate, cobalt sulfate, and magnesium sulfate were dissolved in water. The mixed aqueous solution was adjusted so that the molar ratio of nickel:manganese:cobalt:magnesium was 77.7:9.5:9.8:3.0 and the metal concentration was 2.0 M (mol/dm$^3$). Other than that, a positive electrode active material was prepared and evaluated in the same manner as Example 5.

The results are indicated in Tables 1 and 2.

Comparative Example 1

As a mixed aqueous solution, nickel sulfate, manganese sulfate, and cobalt sulfate were dissolved in water. The mixed aqueous solution was adjusted so that the molar ratio of nickel:manganese:cobalt was 60.0:20.0:20.0 and the metal concentration was 2.0 M (mol/dm$^3$). The firing temperature in the firing step was set to 900° C. Other than that, a positive electrode active material was prepared and evaluated in the same manner as Example 1.

The results are indicated in Tables 1 and 2.

Comparative Example 2

As a mixed aqueous solution, nickel sulfate, manganese sulfate, cobalt sulfate, and magnesium sulfate were dissolved in water. The mixed aqueous solution was adjusted so that the molar ratio of nickel:manganese:cobalt:magnesium was 59.97:20.0:20.0:0.03 and the metal concentration was 2.0 M (mol/dm$^3$). The firing temperature in the firing step was set to 900° C. Other than that, a positive electrode active material was prepared and evaluated in the same manner as Example 1.

The results are indicated in Tables 1 and 2.

Comparative Example 3

As a mixed aqueous solution, nickel sulfate, manganese sulfate, cobalt sulfate, and magnesium sulfate were dissolved in water. The mixed aqueous solution was adjusted so that the molar ratio of nickel:manganese:cobalt:magnesium was 57.9:18.4:18.5:5.2 and the metal concentration was 2.0 M (mol/dm$^3$). The firing temperature in the firing step was set to 900° C. Other than that, a positive electrode active material was prepared and evaluated in the same manner as Example 1.

The results are indicated in Tables 1 and 2.

Comparative Example 4

As a mixed aqueous solution, nickel sulfate, manganese sulfate, and cobalt sulfate were dissolved in water. The mixed aqueous solution was adjusted so that the molar ratio of nickel: manganese: cobalt was 80.0:10.0:10.0 and the metal concentration was 2.0 M (mol/dm$^3$). Other than that, a positive electrode active material was prepared and evaluated in the same manner as Example 5.

The results are indicated in Tables 1 and 2.

Comparative Example 5

As a mixed aqueous solution, nickel sulfate, manganese sulfate, cobalt sulfate, and magnesium sulfate were dissolved in water. The mixed aqueous solution was adjusted so that the molar ratio of nickel:manganese:cobalt:magnesium was 79.96:10.0:10.0:0.04 and the metal concentration was 2.0 M (mol/dm$^3$). Other than that, a positive electrode active material was prepared and evaluated in the same manner as Example 5. The results are indicated in Tables 1 and 2.

Comparative Example 6

As a mixed aqueous solution, nickel sulfate, manganese sulfate, cobalt sulfate, and magnesium sulfate were dissolved in water. The mixed aqueous solution was adjusted so that the molar ratio of nickel:manganese:cobalt:magnesium was 75. 9:9. 3:9. 6:5.2 and the metal concentration was 2.0 M (mol/dm$^3$). Other than that, a positive electrode active material was prepared and evaluated in the same manner as Example 5.

The results are indicated in Tables 1 and 2.

Comparative Example 7

In the firing step, a positive electrode active material was prepared and evaluated in the same manner as Example 5, except that the raw material mixture obtained in the mixing step was fired at 1020° C. for 10 hours in the flow of oxidizing atmosphere (oxygen: 80% by volume).

The results are indicated in Tables 1 and 2.

Comparative Example 8

In the firing step, a positive electrode active material was prepared and evaluated in the same manner as Example 5, except that the raw material mixture obtained in the mixing step was fired at 680° C. for 10 hours in the flow of an oxidizing atmosphere (oxygen: 80% by volume).

The results are summarized in Tables 1 and 2.

TABLE 2

| | Initial charge capacity mAh/g | Initial discharge capacity mAh/g | Positive resistance Ω | Capacity maintenance rate % | Evaluation of thermal stability ° C. |
|---|---|---|---|---|---|
| Example 1 | 192.0 | 170.5 | 3.26 | 83.0 | 253 |
| Example 2 | 191.5 | 170.0 | 3.21 | 83.6 | 255 |
| Example 3 | 192.1 | 169.5 | 3.20 | 85.0 | 263 |
| Example 4 | 187.0 | 164.1 | 3.19 | 86.2 | 273 |
| Example 5 | 221.6 | 198.3 | 3.03 | 82.4 | 229 |
| Example 6 | 211.2 | 186.4 | 3.12 | 83.3 | 239 |
| Comparative Example 1 | 192.1 | 170.8 | 2.47 | 82.4 | 251 |
| Comparative Example 2 | 192.0 | 170.6 | 2.45 | 82.0 | 252 |
| Comparative Example 3 | 178.0 | 149.0 | 4.15 | 73.4 | 278 |
| Comparative | 221.0 | 200.0 | 3.30 | 80.2 | 221 |

TABLE 1

| | Mg additive amount at. % | Firing temperature ° C. | Average particle size (D50) μm | Lattice constant a Å | Lattice constant c Å | (003) crystallite size Å | Amount of eluted lithium mass % | Conductivity S/cm | Li/Me ratio | Composition | Base composition | Presence of heterogeneous phase |
|---|---|---|---|---|---|---|---|---|---|---|---|---|
| Example 1 | 0.1 | 895 | 13.1 | 2.8675 | 14.2163 | 1764 | 0.084 | $1.01 \times 10^{-2}$ | 1.03 | $Li_{1.03}Ni_{0.599}Mn_{0.200}Co_{0.200}Mg_{0.001}O_2$ | NMC622 | Absent |
| Example 2 | 0.5 | 895 | 13.2 | 2.8668 | 14.2186 | 1798 | 0.082 | $9.98 \times 10^{-3}$ | 1.03 | $Li_{1.03}Ni_{0.598}Mn_{0.198}Co_{0.199}Mg_{0.005}O_2$ | | Absent |
| Example 3 | 1.0 | 895 | 13.5 | 2.8658 | 14.2209 | 1832 | 0.080 | $6.02 \times 10^{-3}$ | 1.03 | $Li_{1.03}Ni_{0.596}Mn_{0.197}Co_{0.197}Mg_{0.01}O_2$ | | Absent |
| Example 4 | 3.0 | 895 | 14.2 | 2.8657 | 14.2230 | 1821 | 0.073 | $2.30 \times 10^{-3}$ | 1.03 | $Li_{1.03}Ni_{0.588}Mn_{0.191}Co_{0.191}Mg_{0.03}O_2$ | | Absent |
| Example 5 | 1.0 | 800 | 13.4 | 2.8720 | 14.2054 | 1830 | 0.139 | $1.56 \times 10^{-2}$ | 1.02 | $Li_{1.02}Ni_{0.793}Mn_{0.097}Co_{0.10}Mg_{0.01}O_2$ | NMC811 | Absent |
| Example 6 | 3.0 | 800 | 14.3 | 2.8713 | 14.2072 | 1750 | 0.138 | $9.85 \times 10^{-3}$ | 1.02 | $Li_{1.02}Ni_{0.777}Mn_{0.095}Co_{0.098}Mg_{0.03}O_2$ | | Absent |
| Comparative Example 1 | 0.0 | 900 | 13.0 | 2.8678 | 14.2161 | 1860 | 0.085 | $1.13 \times 10^{-2}$ | 1.03 | $Li_{1.03}Ni_{0.60}Mn_{0.20}Co_{0.20}O_2$ | NMC622 | Absent |
| Comparative Example 2 | 0.03 | 900 | 13.1 | 2.8676 | 14.2161 | 1685 | 0.085 | $1.02 \times 10^{-2}$ | 1.03 | $Li_{1.03}Ni_{0.5997}Mn_{0.200}Co_{0.200}Mg_{0.0003}O_2$ | | Absent |
| Comparative Example 3 | 5.2 | 900 | 16.7 | 2.8677 | 14.2280 | 2216 | 0.072 | $1.56 \times 10^{-4}$ | 1.03 | $Li_{1.03}Ni_{0.5797}Mn_{0.184}Co_{0.185}Mg_{0.052}O_2$ | | Absent |
| Comparative Example 4 | 0.0 | 800 | 11.8 | 2.8730 | 14.2037 | 1736 | 0.160 | $2.79 \times 10^{-2}$ | 1.02 | $Li_{1.02}Ni_{0.80}Mn_{0.10}Co_{0.10}O_2$ | NMC811 | Absent |
| Comparative Example 5 | 0.04 | 800 | 11.8 | 2.8725 | 14.2039 | 1781 | 0.158 | $2.70 \times 10^{-2}$ | 1.02 | $Li_{1.02}Ni_{0.7996}Mn_{0.10}Co_{0.10}Mg_{0.0004}O_2$ | | Absent |
| Comparative Example 6 | 5.2 | 800 | 16.3 | 2.8731 | 14.2096 | 2067 | 0.140 | $3.22 \times 10^{-3}$ | 1.02 | $Li_{1.02}Ni_{0.759}Mn_{0.093}Co_{0.096}Mg_{0.052}O_2$ | | MgO |
| Comparative Example 7 | 1.0 | 1020 | 18.9 | 2.8637 | 14.2189 | 2840 | 0.063 | $1.16 \times 10^{-2}$ | 1.02 | $Li_{1.02}Ni_{0.793}Mn_{0.097}Co_{0.10}Mg_{0.01}O_2$ | | Absent |
| Comparative Example 8 | 1.0 | 680 | 11.8 | 2.8754 | 14.2062 | 870 | 0.194 | $9.33 \times 10^{-4}$ | 1.02 | $Li_{1.02}Ni_{0.793}Mn_{0.097}Co_{0.10}Mg_{0.01}O_2$ | | MgO |

TABLE 2-continued

|  | Initial charge capacity mAh/g | Initial discharge capacity mAh/g | Positive resistance Ω | Capacity maintenance rate % | Evaluation of thermal stability °C. |
|---|---|---|---|---|---|
| Example 4 Comparative Example 5 | 221.2 | 200.1 | 3.28 | 79.5 | 221 |
| Comparative Example 6 | 190.6 | 166.3 | 4.23 | 71.1 | 245 |
| Comparative Example 7 | 192.3 | 162.5 | 3.81 | 63.0 | 229 |
| Comparative Example 8 | 170.7 | 143.6 | 5.96 | 68.6 | 246 |

As indicated in Tables 1 and 2, when comparing Examples 1 to 4 based on NMC622 base composition, in which the ratio of Ni:Mn:Co is 6:2:2, with Comparative Examples 1 to 3, it was confirmed that the results of the initial charge and discharge capacity, capacity maintenance rate, and thermal stability evaluation were compatible and excellent in all Examples 1 to 4. In other words, it was confirmed that the positive electrode active materials of these examples had high capacity, high durability, and high stability when used in a secondary battery.

In contrast, it was confirmed that the thermal stability was poor, because Mg was not added in Comparative Example 1.

It was confirmed that the thermal stability was not sufficiently increased, because an insufficient amount of Mg was added in Comparative Example 2.

In Comparative Example 3, the crystallite size was increased, and a stable crystal structure was not obtained, because the amount of Mg added was excessive. Therefore, it was confirmed that the capacity maintenance rate was reduced. In addition, the initial discharge capacity was significantly reduced due to the large amount of Mg added.

When comparing Examples 5 and 6 based on NMC811 base composition, in which the ratio of Ni:Mn:Co is 8:1:1, with Comparative Examples 4 to 8, it was confirmed that the results of the initial charge and discharge capacity, capacity maintenance rate, and thermal stability evaluation were compatible and excellent in all Examples 5 and 6. In other words, it was confirmed that the positive electrode active materials of these examples had high capacity, high durability, and high stability when used in a secondary battery.

In contrast, in Comparative Example 4, it was confirmed that the thermal stability was poor, because Mg was not added. In addition, it was assumed that when used in a secondary battery, the slurry may react with the electrolyte components during charging and discharging, generating gas or causing the slurry to gel when preparing the positive electrode, because a large amount of lithium was eluted from the positive electrode active material of Comparative Example 4.

In Comparative Example 5, it was confirmed that the thermal stability was not sufficiently increased, because the amount of Mg added was not sufficient.

In Comparative Example 6, the crystallite size was increased, and a stable crystal structure was not obtained, because the amount of Mg added was large. As a result, the durability was reduced. In addition, the initial charge and discharge capacity decreased significantly due to the large amount of Mg added. In particular, it was confirmed that a heterogeneous phase was formed and Mg was not completely dissolved.

In Comparative Example 7, sintering and aggregation progressed and an increase in the average particle size was confirmed, because the firing temperature in the firing step was high. In addition, it was confirmed that the capacity and durability were remarkably inferior to those of Examples 5 and 6, because the crystallite size was extremely large.

In Comparative Example 8, the crystal growth did not proceed sufficiently, and Mg reacted by itself and hardly dissolved in the crystal structure, because the firing temperature in the firing step was low. Therefore, the capacity and durability were remarkably inferior to those of Examples 5 and 6.

For each of the positive electrode active materials in Examples 1 to 6, when used in a secondary battery, cell expansion due to gas generation or gelling of the slurry when preparing the positive electrode are unlikely to occur, because the amount of eluted lithium is low. Furthermore, as a result of the thermal stability evaluation, the temperature of peak oxygen release was higher than 225° C. Therefore, the thermal stability was improved.

From the above-described results, it is presumed that in Examples 1 to 6, the positive electrode active material with high capacity and excellent durability was obtained by not only simply dissolving the magnesium, but also dissolving a predetermined amount of magnesium and controlling the lattice constant to an appropriate range by setting the conditions of the firing step or the like. Furthermore, the crystal structure was stabilized by dissolving the magnesium in a lithium-nickel-manganese composite oxide and the lattice constant is taken as described above, so that the battery characteristics and stability can be compatible.

Note that, magnesium was added by the coprecipitation method, but is not limited being added by such method. As described above, for example, magnesium can be added by the solid phase addition method. However, according to the inventors of the present invention, the addition of magnesium by the coprecipitation method yields a greater improvement in battery characteristics and stability than the addition of magnesium by the solid phase addition method.

As described above, the positive electrode active material for a lithium ion secondary battery, the method of manufacturing the positive electrode active material for a lithium ion secondary battery, and the lithium ion secondary battery are described in the embodiments and the examples, but the present invention is not limited to the above-described embodiments and the examples. Various modifications and variations are possible within the scope of the invention as defined in the claims.

The present application is based on and claims priority of Patent Application No. 2018-144554 filed on Jul. 31, 2018 with the Japan Patent Office, the entire contents of Japanese Patent Application No. 2018-144554 are hereby incorporated by reference.

DESCRIPTION OF THE REFERENCE NUMERALS 12a positive electrode

The invention claimed is:

1. A method of manufacturing a positive electrode active material for a lithium ion secondary battery comprising:
obtaining nickel-manganese composite hydroxide particles represented by a following general formula:

$Ni_aMn_bM-Mg_d(OH)_{2+\beta}$ (2)

in which an element M in the general formula (2) is at least one element selected from Co, Ti, W, B, Mo, V, Nb, Ca, Al, Cr, Zr, and Ta, $0.50 \leq a \leq 0.95$, $0.03 \leq b \leq 0.40$, $0.02 \leq c \leq 0.40$, $0.0005 \leq d \leq 0.05$, $a+b+c+d=1.0$, and $0 \leq \beta \leq 0.4$;

mixing the nickel-manganese composite hydroxide particles and a lithium compound to obtain a raw material mixture; and firing the raw material mixture in a temperature range of 700° C. to 1000° C. in an oxidizing atmosphere to obtain a lithium-nickel-manganese composite oxide wherein in the obtaining of the nickel-manganese composite hydroxide particles, a mixed aqueous solution containing at least nickel, manganese, and magnesium, and an alkaline aqueous solution are continuously supplied to a reactor, and a precipitate is collected by overflowing from the reactor.

2. The method of manufacturing a positive electrode active material for a lithium ion secondary battery according to claim 1, further comprising:

heating the nickel-manganese composite hydroxide particles at a temperature of 105° C. or higher and 700° C. or lower prior to mixing the nickel-manganese composite hydroxide particles and a lithium compound.

* * * * *